US012574309B2

(12) United States Patent
Azzam et al.

(10) Patent No.: US 12,574,309 B2
(45) Date of Patent: *Mar. 10, 2026

(54) SYSTEM AND METHOD FOR ASSESSING COMMUNICATION RESOURCES

(71) Applicant: DEJERO LABS INC., Waterloo (CA)

(72) Inventors: Imad Azzam, Waterloo (CA); David Sze, Waterloo (CA); Todd Schneider, Waterloo (CA); Jonathon Oberholzer, Waterloo (CA); Bogdan Frusina, Kitchener (CA)

(73) Assignee: DEJERO LABS INC., Waterloo (CA)

( * ) Notice: Subject to any disclaimer, the term of this patent is extended or adjusted under 35 U.S.C. 154(b) by 86 days.

This patent is subject to a terminal disclaimer.

(21) Appl. No.: 18/444,572

(22) Filed: Feb. 16, 2024

(65) Prior Publication Data

US 2024/0275682 A1 Aug. 15, 2024

Related U.S. Application Data

(63) Continuation of application No. 16/640,985, filed as application No. PCT/CA2018/051012 on Aug. 22, 2018, now Pat. No. 11,909,593.

(60) Provisional application No. 62/548,916, filed on Aug. 22, 2017.

(51) Int. Cl.
| | |
|---|---|
| *H04L 43/0882* | (2022.01) |
| *H04L 41/0896* | (2022.01) |
| *H04L 43/0829* | (2022.01) |
| *H04L 43/0852* | (2022.01) |

(52) U.S. Cl.
CPC ...... *H04L 43/0882* (2013.01); *H04L 41/0896* (2013.01); *H04L 43/0829* (2013.01); *H04L 43/0852* (2013.01)

(58) Field of Classification Search
CPC ............ H04L 43/0882; H04L 41/0896; H04L 43/0829; H04L 43/0852
See application file for complete search history.

(56) References Cited

U.S. PATENT DOCUMENTS 11,909,593 B2 * 2/2024 Azzam ................ H04L 43/0829

OTHER PUBLICATIONS

Canadian Intellectual Property Office (CIPO), Examiner's Requisition to CA 3,073,451, Mar. 11, 2024.
United States Patent & Trademark Office (USPTO), Non Final Rejection issued to U.S. Appl. No. 16/640,985, Aug. 26, 2021.

(Continued)

*Primary Examiner* — Brian Whipple
(74) *Attorney, Agent, or Firm* — Norton Rose Fulbright Canada LLP

(57) ABSTRACT

In some embodiments, a computer implemented method for assessing network bandwidth availability in a network connection having unknown excess capacity beyond an initial network capacity is provided. There are two cases to be considered: (1) the network has a given capacity and the system doesn't know what it is (e.g., on a cellular network) this capacity may change over time as more users use the network and/or a user is mobile, and (2) the system is assigned capacity but by pushing the network, the system may be able to get more capacity (e.g., on a satellite hub). The excess capacity may be quantified for future potential opportunistic, emergency or priority usage, or in some embodiments, utilized periodically or continuously.

20 Claims, 19 Drawing Sheets

(56) References Cited

OTHER PUBLICATIONS

United States Patent & Trademark Office (USPTO), Final Rejection issued to U.S. Appl. No. 16/640,985, Jan. 25, 2022.
United States Patent & Trademark Office (USPTO), Non Final Rejection issued to U.S. Appl. No. 16/640,985, Jun. 22, 2022.
United States Patent & Trademark Office (USPTO), Final Rejection issued to U.S. Appl. No. 16/640,985, Dec. 15, 2022.

* cited by examiner

SYSTEM AND METHOD FOR ASSESSING COMMUNICATION RESOURCES

CROSS REFERENCE

This application is a Continuation of U.S. application Ser. No. 16/640,985 filed on Feb. 21, 2020, which is a 371 US National Stage of International Application No. PCT/CA2018/051012 filed on Aug. 22, 2028 which is a non-provisional of, and claims all benefit, including priority to, U.S. Application No. 62/548,916, entitled "SYSTEM AND METHOD FOR ASSESSING COMMUNICATION RESOURCES", dated 22 Aug. 2017, incorporated herein by reference.

FIELD

The present disclosure generally relates to the field of communications networks, and more particularly, to improved methods for assessing potentially usable network bandwidth availability.

INTRODUCTION

Communications resources are valuable, and in many situations, a limited resource having practical constraints due to cost, availability, infrastructure, etc. Various organizations, such as service providers (e.g., wireless, microwave, cellular, satellite, wired, undersea) are tasked with allocating a limited, valuable resource across one or more users to service their needs. In some instances, users are allocated a network connection having specific nominal characteristics, such as throughput, latency, bandwidth, overall usage, etc. In some instances, the network capacity is simply unknown.

However, these nominal characteristics often do not represent the true availability of communications resources. Communication resources may be provided on a "best efforts basis", as providers generally oversubscribe their networks given that at any given time, users are typically not using their entire allotted bandwidth. Where a user exceeds the bandwidth allotted by a certain amount, the user's connection may eventually suffer from increased latency, packet loss, reduced quality of service, throttling, etc. The limits of usage where connection issues arise when exceeding the allotted bandwidth is often greater than the allotted bandwidth. The difference between the allotted bandwidth and the limits of usage where connection issues arise provides an opportunistic amount of additional bandwidth that may be available to the user.

It may be desirable for a user to establish and select a specific level of reliability, for example, (e.g., cell alone or cell plus satellite) and additional bandwidth information may be useful when making a decision regarding service levels, cost, and selection of network types.

SUMMARY

In some embodiments, a computer implemented method for assessing network bandwidth availability in a network connection having unknown excess capacity beyond a first (e.g., allocated, initial) network capacity is provided. In particular, there are two cases to be considered: (1) the network has a given capacity and the system doesn't know what it is (e.g., on a cellular network)—this capacity may change over time as more users use the network and/or a user is mobile, and (2) the system is assigned capacity but by pushing the network, the system may be able to get more capacity (e.g., on a satellite hub).

The excess capacity may be quantified for future potential opportunistic, emergency or priority usage, or in some embodiments, utilized periodically or continuously. Accordingly, an existing communication channel on a network interface may be identified as having potentially available bandwidth that can be used where a "ramp up" of bandwidth is useful or necessary.

In an aspect, the method includes maintaining a data structure (e.g., database record, flat file, linked list, object-oriented data structure) storing an estimated maximum network capacity value for a network connection. Where multiple network connections are utilized, a plurality of estimated maximum network capacity values can be stored, and corresponding approaches may be utilized to select one or more network connections for potential usage where additional capacity is required on short notice using existing resources. For example, the data structure may be maintained in a database by a networking resource manager or controller device for access by other network devices.

A probe data payload (or one or more probe data payloads) is generated that is paired with one or more non-probe data payloads, and the probe data payload includes additional (e.g., redundant, copies of data, parity checks, checksum, color depth, overhead) data based on the one or more non-probe data payloads. The probe data payload and the one or more non-probe data payloads are transmitted through a network connection, the probe data payload and the one or more non-probe data payloads exceeding the estimated maximum network capacity value for the network connection. The inclusion of the additional (e.g., redundant) data may be important in some embodiments as the usage of the network connection beyond the nominal allocated capacity may lead to increased latency or packet loss, and it may not always be certain which informational packets are lost, delayed, or misordered, etc. Accordingly, the use of additional (e.g., redundant) data helps prevent or reduce the impact of the lost, delayed, or misordered packets, to some degree.

One or more network response characteristics of the network connection are monitored (e.g., by a continuous ping) to determine whether at least one of increased latency or increased packet loss occurs responsive to the transmission. The increased latency or increased packet loss may be indicative, for example, that a limit for a network connection has been reached.

The packet burst value being estimated is also monitored in some embodiments. The packet burst estimate is utilized to modify step-sizes of probing steps (e.g., make the probing steps bigger) and hence causing the overall probing process to perform faster.

Responsive to the one or more network response characteristics indicating that neither increased latency or increased packet loss occurs, the data structure is updated to increase the estimated maximum network capacity value for the network connection, the estimated maximum network capacity value representative of the assessed network bandwidth availability.

It is important to note that the estimated maximum network capacity value may not be the same as the actual maximum network capacity value at any given time, as the actual maximum network capacity value may be impacted by numerous factors not under the control of or observable by the user. However, a stored estimation can be used to identify patterns in potential overage available beyond allocated resources, and tracking the potential overage may provide for a risk-adjusted approach to attempting to request resources beyond nominally allocated resources.

In another aspect, the probe data payload is sized such that the increased latency responsive to the addition of the probe data payload to the transmission is not expected to be greater than a pre-determined latency target between a transmitter and an endpoint (the latency target may include, for example, a glass to glass (GTG) latency for live video, or audio latency or voice transmission latency). Falling within the pre-determined latency target can decrease a risk of packet loss (or in the case of video, picture loss) between the transmitter and the endpoint resulting from overloading the network connection with the probe data payload. The embodiments described herein are not limited to audio and video communication, and further, in some embodiments, the systems and methods described herein are utilized in relation to other types of real-time networking applications.

In other embodiments, the latency target could include a real-time application with a deadline, where live video with a configured glass-to-glass latency is an example of such a system.

In another aspect, the probe data payload is sized such that the increased latency responsive to the addition of the probe data payload to the transmission does not cause the end-to-end system latency to increase beyond the deadline of a real-time application running on the system. For example, a live video application with a configured glass-to-glass latency of 1500 ms means that the probe data payload should be sized such that the resulting increase in network latency does not cause this deadline to be exceeded.

In another aspect, the probe data payload is sized such that the increased latency responsive to the addition of the probe data payload to the transmission is not expected to be greater than a pre-determined latency target between a transmitter and an endpoint reduced by a safety factor margin, decreasing a risk of packet loss (or in the case of video, picture loss) between the transmitter and the endpoint resulting from overloading the network connection with the probe data payload. The safety factor margin may be useful in adding a further cushion where a risk of packet or picture loss can be catastrophic (e.g., on a live transmission).

In another aspect, the probe data payload is sized to cause a burst in bandwidth required for the transmission of the probe data payload and the one or more non-probe data payloads. Burst probing approaches may be otherwise described as "greedy approaches" and can be useful where the service provider may be applying time-based countermeasures to prevent network resource usage beyond allocation (e.g., pattern based throttling, etc.), and the application of a "burst" approach may reduce the ability for time-based countermeasures to react (e.g., as the burst may occur only on a difficult to predict periodic basis), etc. A specific technical challenge to be overcome in some embodiments is countermeasure avoidance through the use of a "burst-based" probing approach, and this may be an improvement over stepwise or stairstep approaches.

In another aspect, the "burst" aspect operates so that a system managing the network connection is able to observe a desired rate for a device, and the system managing the network connection rebalances bandwidth allocations between devices based on the ratios of their desired rates. For example, rather than countermeasures, in some embodiments, the network connections may be managed in a co-operative manner whereby some or all devices or a distributed service running on all devices cooperatively shares available network bandwidth, and probing is used for signalling desire for bandwidth.

In another aspect, at least one of the increased latency and the increased packet loss is averaged across a pre-defined duration of time. In some situations, a network assessment system may be configured to track patterns and temporal aspects of network characteristics and demanded bandwidth that could change over time (e.g., the statistics of requested bandwidth) over wider durations of time as opposed to immediate network responses, as a steady-state response to probing activities may be more informative on networking characteristics than immediate responses (e.g., steady state responses may indicate an acceptance of overage requests, stabilization of latency and packet loss, or, in some cases, increased throttling or countermeasures).

In another aspect, the method further includes iteratively probing the network connection by generating one or more additional probe data payloads, each sequential additional probe data payload of the one or more additional probe data payloads being sized to require differing amounts of data than a previous probe data payload, the one or more additional probe data payloads used to iteratively update the estimated maximum network capacity value for the network connection over a period of time.

In some embodiments, the size of each sequential additional probe data payload is increased responsive to the one or more network response characteristics when the one or more network response characteristics indicate that neither increased latency or increased packet loss occurs. In some embodiments, the size of each sequential additional probe data payload is decreased responsive to the one or more network response characteristics when the one or more network response characteristics indicate that at least one of increased latency and increased packet loss occurs. In some embodiments, sequential additional probe data payloads apply a "step-wise" approach for probing, whereby gradually increasing or decreasing steps of overage requests beyond allocations are utilized. A step-wise approach may be particularly useful where the impact of a loss of packet or picture transmission is catastrophic. A step-wise approach, in some situations, may be less at risk for triggering a serious communication resource request countermeasure.

Where the network connections are configured for distributed co-operation, rather than encountering countermeasures, a network connection controller is configured to co-operate in allocating bandwidth across multiple devices, and the step-wise approach may be used for signalling desire. Relative to the greedy/rapid allocation approach, a potential benefit to the step-wise increase includes where increasing bandwidth at one device is less likely cause a sudden impact to the available capacity for all other devices.

In another aspect, the size of the increase or the decrease of size of each sequential additional probe data payload is a constant value. In another aspect, the iterative probing occurs until a steady state estimated maximum network capacity value is observed for a period of time, and comprising: updating the data structure to store the steady-state estimated maximum network capacity value.

Pattern recognition may be applied to the data structure to indicate context specific excess capacity, for example, indicative of cyclical availability (e.g., the most excess bandwidth may be available at 3:00 AM EST), etc. In another aspect, the estimated maximum network capacity value is reserved for usage during at least one of emergency or priority communications.

In another aspect, the estimated maximum network capacity value is reserved for usage during at least one of high bandwidth requirements, emergency situations, spikes in bandwidth requirements, and priority transmissions.

In another aspect, the data structure is populated with an initial estimated maximum network capacity value set at an allocated network capacity value.

In another aspect, the estimated maximum network capacity value is transmitted to a network controller.

In another aspect, the data structure further includes a packet or picture loss risk tolerance factor value, and the packet or picture loss risk tolerance factor value is used to determine the size of the probe data payload, the packet or picture loss risk tolerance factor value being substantially proportional to the size of the probe data payload. A packet or picture loss risk tolerance factor value may include product of various characteristics, such as latency of transmission, priority of transmission, expected size of lost data that needs to be replaced, minimum quality of picture that must be maintained (in some instances, it may be better to drop a frame than to diminish quality).

In a live transmission example, the video requirements for a particular crucial video point may be increased, and it may be desirable to obtain as high a quality of communication as possible (e.g., end of a basketball game). In some cases, the spike in requirements may occur as a result of compression or other encoding techniques, whereby compression is particularly ineffective for a particular point in the video (e.g., where pixel prediction cannot be applied due to many unpredictable color changes in a scene, or a higher level of encoding is necessary for audio due to temporary higher quality requirements (e.g., an audio track using an adaptive bitrate)). During these times, additional bandwidth, for a temporary period of time may be useful, but adding the additional bandwidth should not be obtained at too high of a risk of losing picture quality.

In another aspect, the data structure further includes a packet or picture loss risk tolerance factor value, and the packet or picture loss risk tolerance factor value is used to determine the size of the burst. The data structure may also identify a period between bursts, in some examples, the period helping prevent the service provider from identifying that a particular user is probing the network connection for availability.

In another aspect, the data structure further includes a packet or picture loss risk tolerance factor value, and the packet or picture loss risk tolerance factor value is used to determine the size of the constant value.

In another aspect, the data structure is maintained by a central bandwidth manager, the central bandwidth manager configured to triage excess bandwidth requests. Emergency/abrupt usage is identified by burst probing, and general steady state usage parameters are identified by step-wise probing approaches that are continuously applied across a period of time. The central bandwidth manager, in some embodiments, can allocate bandwidth in priority order by controlling edge nodes.

Patterns of availability as a result of probing may be associated, for example, with time of day (e.g., there is a history that after 2 AM there are actually no bandwidth restrictions as opposed to prime time usage, identification of trends of use by other users of an oversubscribed network, identification of potential network throttling).

In another aspect, the data structure is maintained by a de-centralized or distributed bandwidth manager (e.g., provisioned across a plurality of devices).

In another aspect, the updated estimated maximum network capacity value is associated with an expiry time duration, and upon elapse of the expiry time duration, the estimated maximum network capacity is reset to the allocated network capacity value.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
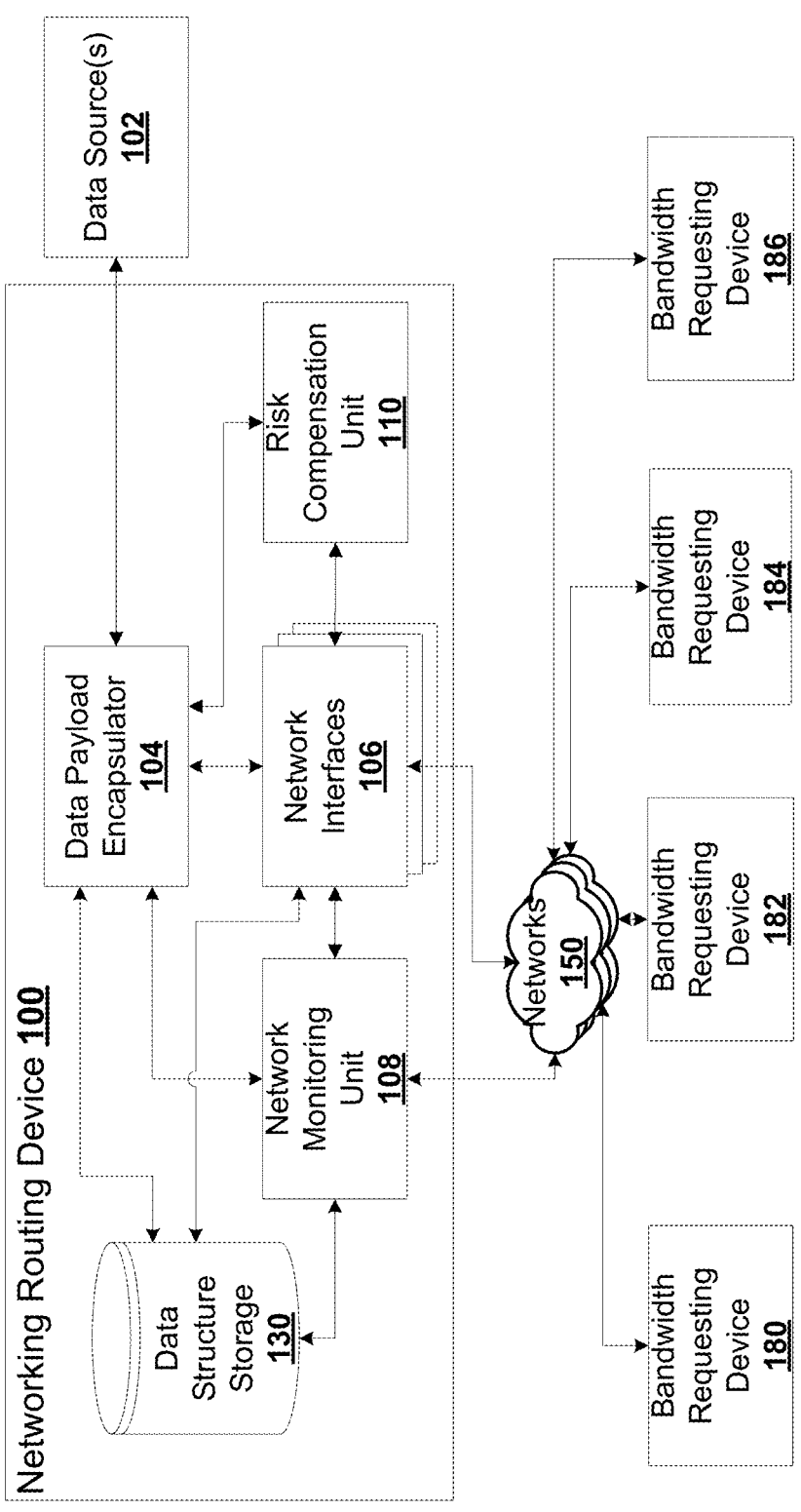
FIG. 1 is a block schematic diagram of an example system, according to some embodiments.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Bandwidth limitations on network connections can often be illusory. Service providers servicing a number of customers allocate available bandwidth to meet the needs of the customers. However, the needs of individual customers can vary over time, and it is statistically unlikely that each of the individual customers will request their maximum allocation at a particular point in time. Accordingly, service providers oversubscribe customers, such that a sufficient quality of service can be delivered at a reasonable price point.

Accordingly, a technical problem encountered by a networking routing device may include determining how shared bandwidth on a network can be distributed among multiple, simultaneous users, particularly when bonded/blended transmissions suffer the loss of one or more of the communication paths. This challenge is especially prominent when there are cost or quality implications relating to how the data is transferred (e.g., limiting scope of use of high-cost satellite to when it is truly needed). Where the networking routing device is configured for blending networks (e.g., cell and satellite), a user may seek to request additional bandwidth on existing network connections beyond that nominally allocated value for a particular existing network connection. In some cases, there is an unknown quantity of bandwidth beyond the nominally allocated value, and where information on the potential bandwidth beyond the nominally allocated value can be readily estimated or obtained, the information may be useful for opportunistically providing additional bandwidth when necessary (e.g., in a downstream sudden spike or emergency situation).

For example, a transmitter may request additional bandwidth, and a smart/intelligent networking routing device is provided as an infrastructure component adapted to identify or estimate capacity allocation, and to determine how the request can be handled.

The networking routing device may be configured to continuously or periodically probe the network connections to assess actual capacity allocation. A matrix of conditions and potential estimations can be established, and adapted based on identified patterns of latency/packet loss response, and an estimation may be tailored dynamically as conditions change. Pattern recognition approaches may be utilized, and determined characteristics, in some embodiments, may be weighted for analysis based, for example, on how recently conducted the probe was (e.g., past results are not always indicative of future results).

Where actual capacity allocation is not known, the probing approaches are applied to assess actual capacity allocation by monitoring network responses to probe data payloads. Accordingly, the networking routing device is configured to develop and maintain, as a data structure, a model of requirements and capabilities of connected devices and network connections, their usage and real-time connection performance.

The network routing device either has bandwidth allocated by a central bandwidth manager or it probes and obtains the bandwidth the network routing device needs by itself (possibly based on a maximum bandwidth cap that has been preset). The network routing device then allocates this bandwidth to the attached devices/endpoints. When emergency or over-allocation requests are made, the networking routing device is configured to identify opportunistic requests available to the various devices, and on a risk-adjusted basis, "ramp up" bandwidth usage based on the estimated available bandwidth beyond the nominal allocation.

The networking routing device of some embodiments is configured to manage risk by adopting various approaches, for example, by incorporating redundant or error correction data into probes to mitigate or reduce a risk of lost packets, by modifying the size of a maximum allowable bandwidth request, among others. The networking routing device may be configured to cause (e.g., transmit control signals) transmitters or other devices to modify transmission parameters in response to the estimated available bandwidth beyond the nominal allocation. For example, the modified transmission parameters may modify encoding, adaptive bitrates, error correction, among others. The networking routing device in some embodiments is configured for probing a network connection or multiple network connections to identify parameters around a potential "ramp up" of bandwidth usage.

Approaches described herein may operate on various types of communication networks, such as microwave networks, satellite networks, cellular networks, WiFi networks, wired network connections, etc. For high cost networks, such as a satellite network, the benefit of identifying opportunities to seek additional bandwidth on an existing connection may be further valuable, and identifying the opportunities to seek additional bandwidth can be used, for example, in emergency situations when a cell network disappears or is otherwise becomes unusable or unsuitable for the continued transmission (e.g., a live video stream with a certain latency and bitrate expectation). The greedy probing/allocation approach of additional bandwidth can, in some embodiments, be used in emergency situations, and the stepwise (in some embodiments, stair-step) approach described in some embodiments can be suitable for non-emergency or steady-state situations. The stepwise approach includes a series of "steps" which are used to ramp up a bandwidth usage incrementally. In some embodiments, stepwise steps are equally sized, in another embodiments, ramp-up is done based on linearly growing steps, geometric growing steps, logarithmically growing steps. In some embodiments, steps may decrease as bandwidth usage becomes larger, for example, where the first steps are "rough" tuning and the later steps are "fine" tuning.

The probing approach can be adaptive so that depending on the level of risk an application/user desires to take and the tolerable risk profile (amount of bandwidth needed X how quickly it is needed), an appropriate "blend" between "greedy" and "ramping slowly" can be selected. Typically, greedy allocation could be used in high risk (emergency situations). In lower risk situations, a ramping approach with a rate proportional to the level of risk would be used.

The probing approaches can be modified further through determination of the "step size" of a stairstep/ramping approach, or a "greedy" approach, and in some embodiments, a blend of approaches can be utilized (e.g., a large "burst" increase followed by stairstep decreases, or vice versa).

The probing approaches, in some embodiments, are associated with connections that are made of multiple connections that are bonded or blended together, and may probe the bonded/blended connections separately or in aggregate (e.g., probing against the bonded/blended connection as a unitary connection). In some embodiments, the network monitoring unit is configured to monitor separate network connections, or there are separate network monitoring units for each network connection, or a combination thereof.

The system, in some embodiments, is utilized to maintain a targeted reliability, especially where the actual capacity of the network is unknown (e.g., a best efforts allocation is provided) or fluctuating (e.g., driving around with a cellular connection). For example, the network connection may be probed periodically or during periods of low traffic, and if the actual available bandwidth is less than the targeted reliability based on the probing, the system may, for example, request additional resources (e.g., at greater expense), re-allocate resources (e.g., shuffling usage to higher priority uses), send command signals to reduce usage (e.g., reduce encoding rate of non-critical communications), send notifications/alerts (e.g., "warning, your network reliability is less than targeted"), among others.

The network monitoring unit may, for example, request additional network resources to a bonding server such that the bonding server bonds additional underlying network connections to maintain at least the targeted reliability. In some embodiments, the probing is conducted by a bonding server or router to ensure that the overall connection provided by the network can meet a targeted reliability metric.

In another embodiment, the probing may be conducted periodically to establish whether a user or entity is getting the reliability that was allocated or promised the user or entity (e.g., what was paid for). In this example, the network connection may be probed periodically or during periods of low traffic, and if the actual available bandwidth is less than the expected reliability based on the probing, an alert or notification or other control signal may be generated automatically.

FIG. 1 is a block schematic diagram of an example system, according to some embodiments.

A networking routing device 100 may be configured to monitor network characteristics in response to the transmission of probe data transmissions by the networking routing device 100, and track the response to identify potential opportunities to access excess capacity, including, for example, identifying patterns of accessibility, the amount that is accessible.

The networking routing device 100 is configured for assessing network bandwidth availability in a network connection having unknown excess capacity beyond an allocated network capacity, in some embodiments. In alternate embodiments, the network connection rather than having unknown excess capacity, has a controller that operates in concert with the networking routing device 100 whereby "burst" or step-wise bandwidth requests are utilized in a cooperative manner to signal increased allocation requests. The networking routing device 100 may include a data structure storage 130 configured for maintaining a data structure storing an estimated maximum network capacity value for various network interfaces 106 each related to a corresponding network connection. Data sources 102 provide source information that may need to be routed or transmitted across networks 150 via network interfaces 106. Data sources 102, for example, may include video transmitters, audio transmitters, overhead information sources, metadata information sources, among others. Information received from data sources 102 are utilized to generate one or more data payloads 104 that are communicated across networks 150 via network interfaces 106.

Networks 150 may include, for example, cellular networks, satellite networks, wired networks, Wifi networks, and combinations thereof. In some embodiments, the networks 150 include one or more bonded or blended connections, which are intelligently aggregated network connections that have several underlying network connections.

In some embodiments, the one or more underlying connections are controlled by specialized bonding/blending circuitry present on routers, which, for example, manage and/or otherwise direct traffic across the one or more bonded or blended connections through, for example, establishing different data transmission/error control roles, distributing data traffic, among others. When probing one or more bonded or blended connections, in some embodiments, the aggregated bonding/blended connection is probed, in other embodiments, individual underlying connections may be probed.

As described in various embodiments, the networking routing device 100 is configured to generate probe data payloads that are paired with one or more non-probe data payloads and transmitted such that the networking routing device 100, for one or more network connections, exceeding the estimated maximum network capacity value for the one or more network connections.

A network monitoring unit 108 is configured to track one or more network response characteristics of the network connection to determine whether at least one of increased latency or increased packet loss occurs responsive to the transmission, and the monitored network characteristics are maintained in data structure storage 130. Responsive to the one or more network response characteristics indicating that neither increased latency or increased packet loss occurs, data structures are updated to reflect estimated maximum network capacity values for the network connections, the estimated maximum network capacity value representative of the assessed network bandwidth availability, or a reliability metric. In some embodiments, instead of increased latency or increased packet loss, an acceptable level of increased latency or an increased packet loss is tracked against instead, for example, to account for the potential skewing effect of noise. Accordingly, in an embodiment, the acceptable level of increase is based on a measured maximum level of ambient "noise" in relation to the bandwidth.

The network characteristics may include latency, packet loss, among others. In some embodiments, through-put and cost can also be monitored. Derived characteristics such as latency, packet loss, cost and through-put variation can also be monitored, and for example, can be utilized to assign a reliability metric to a connection. The data structures can thus be utilized in downstream applications to estimate whether potential excess bandwidth is available on a particular network connection or network 150, providing a mechanism that can be used to quickly ramping up usage when needed. However, ramping up usage when needed and the probing activities may lead to potential latency increases, packet loss, and other undesirable network effects (e.g., when the limit for a network 150 is met/exceeded, especially for greedy/rapid allocation approaches), and a risk compensation unit 110 is provided to, in some embodiments, modify encapsulated data payloads to include further redundancy or error correction.

By having a means of quickly ramping up usage on a connection (e.g., satellite), a user can push more data down a cellular connection (less reliable, but cheaper), with an estimation that the connection should be able handle the emergency case. The connection being tested can include, in various embodiments, secondary, auxiliary, and backup connections, among others. A connection can include a combination of connections of various types and various characteristics, such as a bonded connection made of a set of connections (e.g., a heterogeneous bonded connection including both satellite and cellular connections). In some embodiments, the connection is a baseline cellular connection, or a baseline transport connection.

In another preferred embodiment, the connection is a group of cellular connections (each being managed to deliver on overall through-put, latency and packet loss targets) with satellite being used as a backup (minimal bandwidth until we need it to use it because of limitations on the cellular networks).

In another preferred embodiment, there is a mode were all connections (including satellite or DSL) are being used roughly equally and when cellular has problems, more of the satellite (or DSL) connection's bandwidth is used. In some instances, the user may be likely to be driven by economics, and the system is adapted for making the most use of the connection(s) that meet their needs at the lowest cost.

The probing approach allows for a more aggressive approach for using the available network connections. A user may also set a cost target and/or a level of reliability in advance and have this determine which connections are used.

Without utilizing some approaches described herein, a user or a networking routing device 100 would need to take a more conservative approach (e.g., use the satellite more as a baseline transport, to avoid picture/data loss, since a router cannot shift the transmission to the satellite quickly enough to keep the stream or picture intact). Other situations where additional bandwidth on existing network connections include scenarios where the price of a network goes up quickly and it is desirable for a device to quickly transfer to a cheaper network without risking picture loss. By handling the emergency case adeptly, the system allows for blending of networks for applications and combinations of networks that might not otherwise be practical, thereby reducing costs and potentially providing a mechanism for responding to changes in network conditions or prices.

Using some approaches described below, such as a greedy/rapid probing approach, a step-wise probing approach and/or a blending of the step-wise and greedy approaches, a more aggressive approach may yield increased network throughput and efficiency for a given set of network connections, and for a given set of application needs. A model of potential additional availability can be maintained for downstream usage of existing networking connections beyond nominally allocated capacities. The probing results may be stored and tracked over a period of time by network monitoring unit 108, provided in the form of a data structure for future reference, as there may be particular times of day or locations (e.g., for wireless signals) which lend better to potential overcapacity situations.

The data structure may be traversed prior to attempting an overcapacity transmission to check if there is adequate estimated reliability to handle the overcapacity transmission at the given contextual situation (e.g., time, location). If there is not enough adequate estimated reliability, the system can be configured to obtain other communication resources to ensure that the overcapacity transmission can be handled.

The application of these probing techniques may include interoperation with one or more transmitters or data sources to be aware of the underlying bandwidth allocation/probing activities that is occurring as the transmitters or data sources may need to adjust their data rate in response to an external controller and/or add in redundant data to counter anticipated packet loss.

Expected packet loss and latency spikes are measured and reported to the same networking routing device 100, and the information may be packaged and maintained such that the networking routing device 100 and/or the data sources have an estimation of potential bandwidth availability. In other words, the networking routing device 100 of some embodiments is configured to generate, by a series of automated or semi-automated probing processes, on-line modeling of the connection (network) characteristics and using the knowledge to implement real time "network blending"—and in extreme cases, provide complete fail over between connections. In some embodiments, the networking routing device 100 tracks, at network monitoring unit 108, whether the connection is even providing a promised level of reliability as provided through periodic probes of the network connections 150. For example, if a news broadcaster purchases a network connection that promises a bandwidth of 150 Mbps at any given time, it is able to periodically probe or test the networks 150 to observe if the promised maximum throughput is possible.

This can be important if the news broadcaster, at a moment's notice, needs maximum bandwidth for a transmission at unexpected times, for example, to capture a breaking news event. The probing data can be referred to by a networking routing device 100 to establish reliability. In some embodiments, the networks 150 may intentionally be requested to allocate a lower capacity than the maximum bandwidth if the probing information shows that the maximum bandwidth (or greater) is actually available, despite the connection advertising a specific capacity (e.g., 120 Mbps is promised, but 150 Mbps is actually available, as evident in the probe results).

Figure 2:
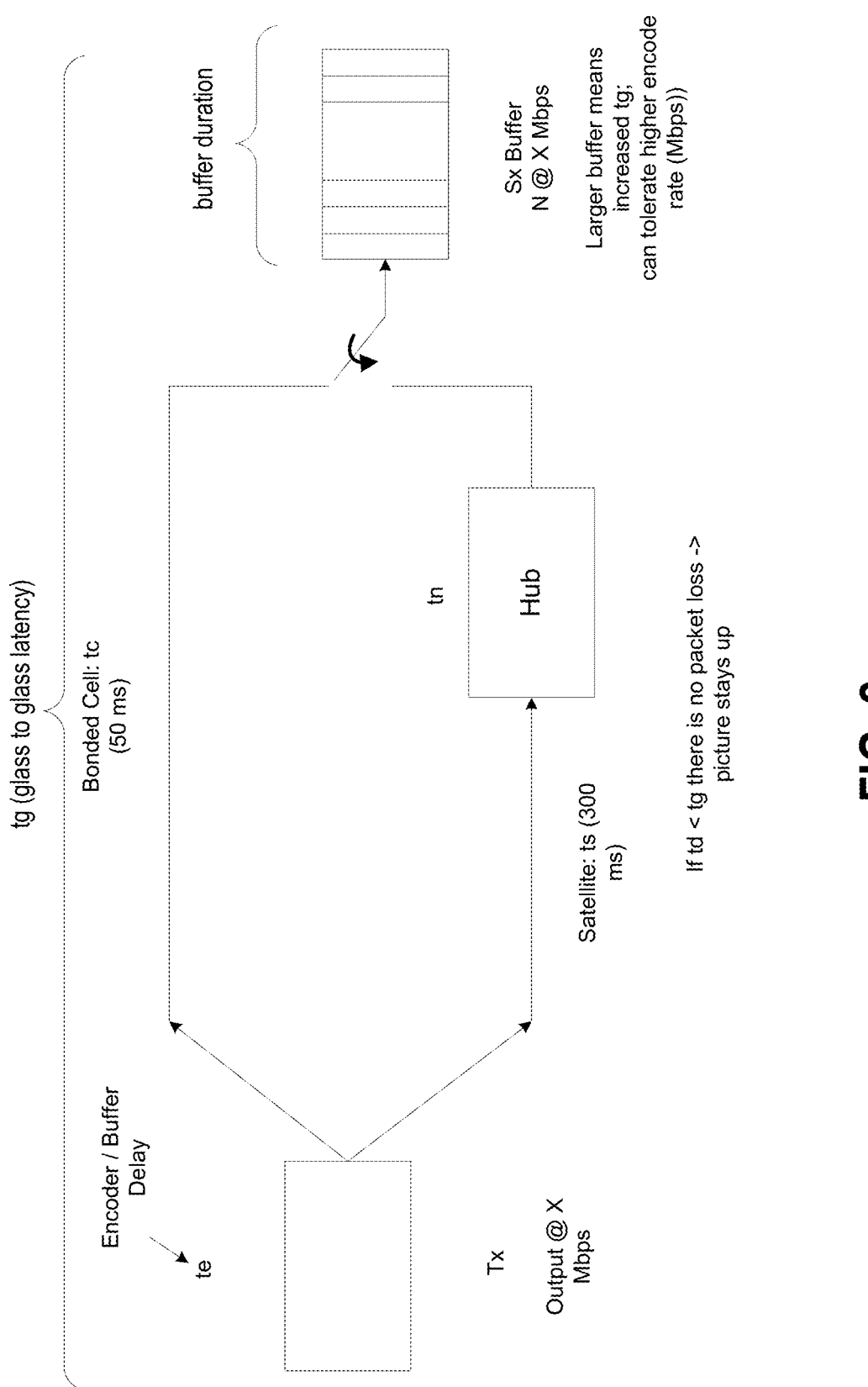
FIG. 2 is a diagram illustrating some of the time parameters for consideration, according to some embodiments.

The networking routing device 100 is configured to balance the risk of loss of packets (or in the case of video, picture) as a result of the probing/increased bandwidth requesting activities such that, in some embodiments, a potential loss of packets or picture is estimated and managed. For real time video transmission with a pre-set glass-to-glass latency when the endpoint (transmitter) must fail over to a connection with a bandwidth delay product that is longer than the total delay (td), as shown in FIG. 2, such that the picture will be maintained despite the loss of the lower delay cellular connection. The same holds for other applications that must meet hardware latency targets.

The probe data is sized specifically to decrease a risk of picture loss between the transmitter and the endpoint in some embodiments, as the latency responsive to the addition of the probe data payload is less than or equal to the glass to glass latency, or less than or equal to the glass to glass latency after a safety margin is applied.

In some embodiments, a central bandwidth manager may be provided where the system is configured to "offer" a networking routing device 100 a certain network blend (and hence a certain cost at certain latency), and with those offers being made in real-time based on the current network conditions, mix of transmissions occurring or expected to occur etc.

Where there are multiple users, a networking routing device 100 may be configured to accept control inputs from a central bandwidth manager that is configured to push maximum bandwidth "caps" to the networking routing device 100 but it can also allocate bandwidth to manage risk, overall network cost and other key parameters, maintaining a view of potential opportunities using probing and analysis techniques executed on the networking routing devices 100 as described in some embodiments. In an alternate embodiment, instead of a "central bandwidth manager", the networking routing devices 100 could collaboratively allocate the bandwidth among themselves. In another alternate embodiment, the "transmitter/endpoint" and the "networking routing device 100" can be combined into a single device or system.

In various embodiments described below, innovative techniques of probing for more bandwidth from a shared bandwidth network by intentionally transmitting more data than is currently allocated to the networking routing device 100 are disclosed. This over-allocation request is likely to induce packet loss and/or a spike in latency so redundant data sufficient to mitigate against the expected packet loss may be included in the over-allocation request. The redundant data allows a level of loss to be handled without suffering a decrease in quality.

The capabilities of a connection can be probed using paired packet techniques pairing actual data payloads alongside probe data payloads. In some situations (e.g., when cellular network connections change), there may be a need to get an increased bandwidth allocation from the shared network (e.g., satellite) bandwidth.

In some embodiments, the multiple packets can be utilized whereby identifiers are appended to probing packets or other data packets such that the packets are identifiable as between different bursts. The appended identifiers may aid in determining network response to additional bandwidth requests beyond nominally allocated bandwidth. Alternatively, "send timestamps" of a packet may be tracked.

If this over-allocation request is met by the network, the networking routing device 100 may identify the potential availability and for future transmissions, may then replace redundant data with more useful data. For example, in video transmission, a transmitter, having a view of potential availability from a networking routing device 100, can ramp up the encode rate of an adaptive rate video encoder based on a determination that a probing "over request" has delivered increased bandwidth with acceptable performance.

Where over-allocation requests are made, there is an increased likelihood of transmission failure as the network may respond negatively to the request by increasing latency, packet loss, reducing quality of service, engaging in throttling behavior, among others. Accordingly, in some embodiments, the networking routing device 100 is further configured to estimate a probability of failure based on real time measurements of network reliability and historical information based on geo-location or other relevant parameters.

The networking routing device 100 may be configured to utilize pre-paid shared, bandwidth connections preferentially to improve shared bandwidth utilization and reduce cost. In some situations, this may increase the risk of packet or picture loss, so this preferential use can be monitored and controlled by the centralized bandwidth manager to ensure that the possibly higher risk can be tolerated. For example, a controller may assess lower risk situations or durations where there is not full bandwidth usage for determining when probing packets can be utilized to test and measure the level of excess capacity that is available. In other embodiments, the networking routing device 100 is configured only to conduct probing during periods of low network activity, and to maintain a data structure corresponding to specific times of day (e.g., Wednesday from 7 PM-9 PM) and excess bandwidth noted during probes at these times of day. The data structure may be referenced in future requests to estimate whether excess bandwidth would likely be available at a particular time.

Excess bandwidth in the shared bandwidth pool can be used to manage connectivity risk, and applications/user devices may be implement specific policies to account for or counteract potential downtime due to latency/packet loss increases (e.g., providing a managed connection similar to pooled risk for insurance policies). In some embodiments, risk can be distributed across a large number of users or requests, and opportunistic bandwidth availability can be captured to reduce an overall cost of service or improve an overall quality of service.

The central bandwidth manager of some embodiments is configured to compute the overall risk and distribute policies to networking routing devices 100 based on requests that have submitted by behalf of applications/user devices/transmitters. Policies may include modifications to transmission characteristics (e.g., bitrates), increased redundancy in probing mechanisms, modified error correction mechanisms (additional checksums, parity bits, header information, timestamps, identifiers), etc. The central bandwidth manager may be one or more devices, and in some embodiments, the bandwidth management function is provided by a set of distributed or cloud devices as opposed to a single server.

Examples of bandwidth reallocation and probing approaches may include:

Step-wise reallocation, whereby incremental (e.g., small), controlled steps are used to reallocate bandwidth to a device (e.g., a bandwidth consuming device) by the networking routing device 100. Each step may, for example, require a few seconds, there may be a reduced latency spike or reduced packet loss relative to the rapid/greedy reallocation approach, and accordingly, there may be reduced impact on other system users or risk of loss of picture.

Rapid/greedy reallocation: one or more (e.g., a single) large step can be used to quickly force reallocation of bandwidth to a networking routing device 100. This reduces the time required to reallocate bandwidth. This large step can take, for example, three to four seconds and there is a latency spike and packet loss while the bandwidth is reallocated. In extreme (and rare) cases, this can result in packet loss/picture break-up.

Combined approaches utilize aspects of both step-wise and rapid/greedy reallocation (e.g., initial rapid/greedy reallocation, followed by step-wise reductions, or vice versa).

In some alternative embodiments, adaptive (larger) step sizes are used in combination with multiple steps (fewer than used in step-wise reallocation) to reallocate bandwidth to a device. Adaptive approaches provide reduced latency spike magnitude and reduced probability of packet loss. The combination of the two methods can provide some advantages each approach.

FIG. 2 is a diagram illustrating some of the time parameters for consideration, according to some embodiments. FIG. 2 demonstrates a system where a transmitter (Tx) transmits video data to a receiver (Sx), over multiple links, including but not limited to, one cell link, and one satellite link. Note, other examples might include multiple links of various types, where the various network types will have different attributes (e.g. latency, throughput).

Different scenarios are possible, and the variables and equation may be modified accordingly. For example, in some cases, the includes two parts, (1) transmitter encode and (2) transmitter buffer. In some scenarios, the system may be configured to re-encode the frame (possibly at a lower frame rate (so there is less data, so the data can get there faster and thus meet the glass-to-glass requirement)), and/or because the frame/packet is no longer available on the transmitter, or in which we choose to simply grab the initial frame/packet off of the buffer, so as to remove the need to re-encode. One of those two paths (saving on the time and compute for the re-encode, or saving on the amount of data sent if we do re-encode) may be advantageous for a given circumstance. For example, in some scenarios, it may be faster to resend the data, than to do the re-encode and send less data, depending on the value of the (encode time only) vs. the transmission time.

The approach is adapted for reducing/minimizing the time it takes to clear the backlog (which is a particular amount of data), and opportunistic approaches can be utilized to able to ramp up the available bandwidth more quickly.

The "glass to glass latency" of the transmission is defined by tg. This latency represents the time between when a shot is captured, and when it is displayed at the receiver. There are numerous components in the transmission with latencies related to their task, the sum of which creates the total delay td. Such latencies include te, the encoder and buffer delay created by the transmitter Tx (the can be broken into two separate values, one for encoding and one for buffering on a transmitter as both may not always be applicable in all cases), the delay tb created by buffering on the receiver Sx, and the transmission time indicated by tc in the case of cellular transmission, and ts (satellite latency delay) and th (satellite hub delay, caused by need to reallocate bandwidth for the satellite transmission). In cases where there is a problem detected (e.g., lost packets) at Sx, there is a delay of tx, which represents the time needed by Sx to detect the lost packets.

When a transmission is made over cell, and the cell connection drops entirely, this will first be detected at the receiver Sx, when it determines that packets are missing. The amount of data "lost" on the cell network is tc*Mb, where Mb is the bitrate on the cell connection and tc is the latency of the cell connection. The receiver must then send a message back to the transmitter, over the satellite connection, leading to a delay of ts.

The transmitter re-encodes and/or and retransmits the lost packets, incurring a delay of the. The retransmission travels over satellite, adding another ts, along with the time th that was required to allocate the bandwidth to Tx, to allow transmission of the tc x Mb of data.

$$\text{Thus, } td = tc + tx + 2*ts + te + th.$$

In a scenario where td<tg, there will be no packet loss, and no frames will be lost. In some embodiments, the value for td further includes the time required for the transmission of the data over the satellite connection.

In cases where a standard step-wise technique is used to slowly acquire bandwidth on the satellite link, the value of th can be so high as to make td>tg much of the time.

Using the techniques of some embodiments enables the system to quickly acquire the more reliable (and generally higher latency and more costly) satellite bandwidth (effectively reducing the value th), when the cell link or links become unavailable or drop precipitously, one may increase the probability that td<tg, thereby eliminating packet loss, and allowing the video shot to be displayed at Sx without dropped frames.

By using higher cost satellite only when necessary (e.g., as a backup), rather than the primary mode of transport and employing techniques to reduce/eliminate packet/picture loss that may result from the lower reliability of the cellular network (e.g., compared to satellite), the cost of transmission may be reduced by transmitting more data over the lower cost cell links.

In another embodiment, the amount of time it takes to retransmit a volume of data is (tc×Rcell)/(Rsat), where Rsat is the current bitrate over satellite. In some embodiments, Rsat is a function of time rather than a constant, especially for an example step-wise probing scenario.

With respect to the total duration of 'td', there are new video frames being generated by the encoder, adding to the backlog. In an example, these are generated at a rate of Rsat', meaning the total time required to transmit these new packets is tn=(td×Rsat')/(Rsat). In this example, the new constraint would be: td+tn<tg. In some embodiments, the networking routing device 100 is configured to maximize Rsat' subject to the above constraint.

Figure 3:
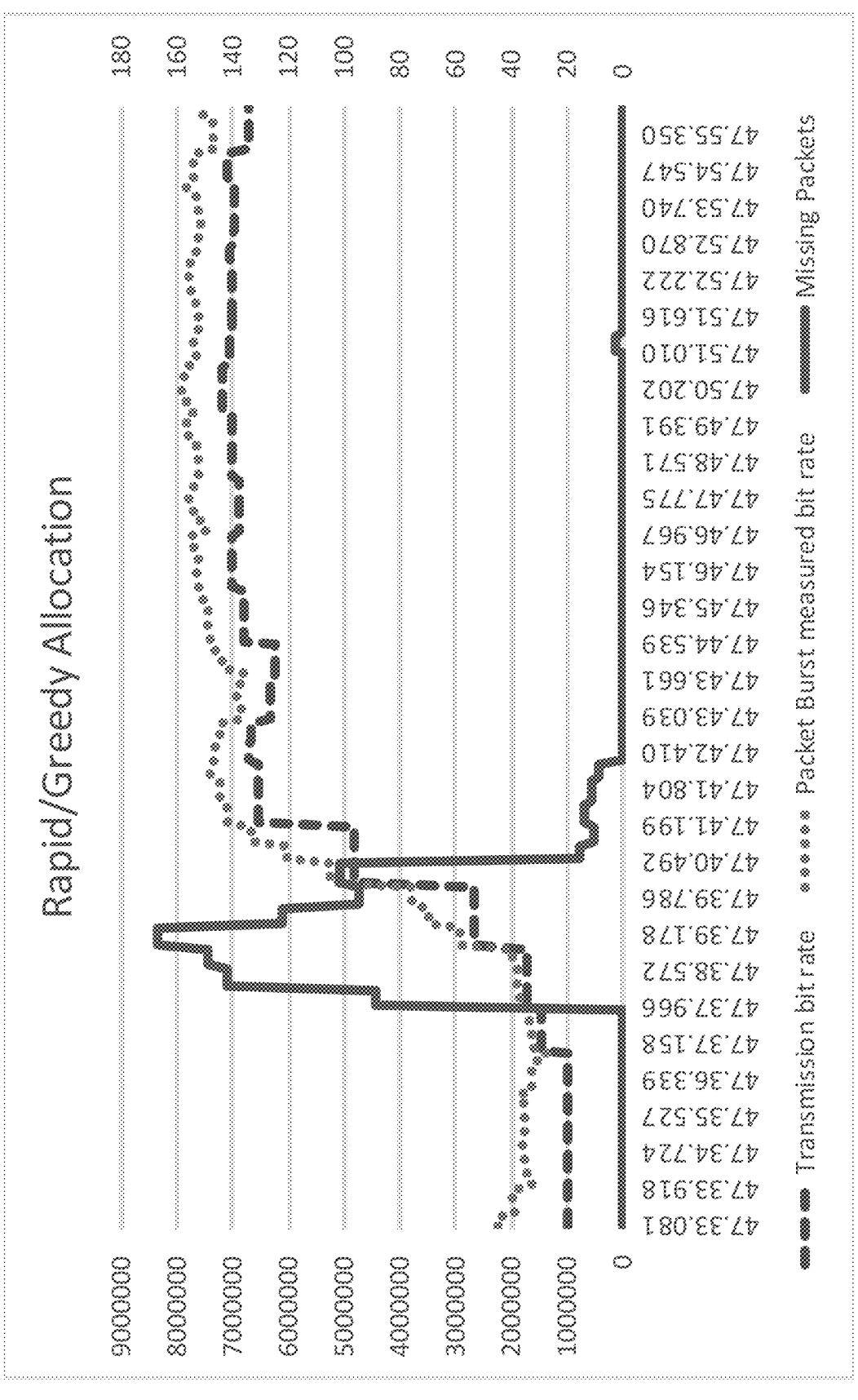
FIG. 3 is a graph illustrating an example response to a rapid/greedy allocation approach, according to some embodiments.
Figure 4:
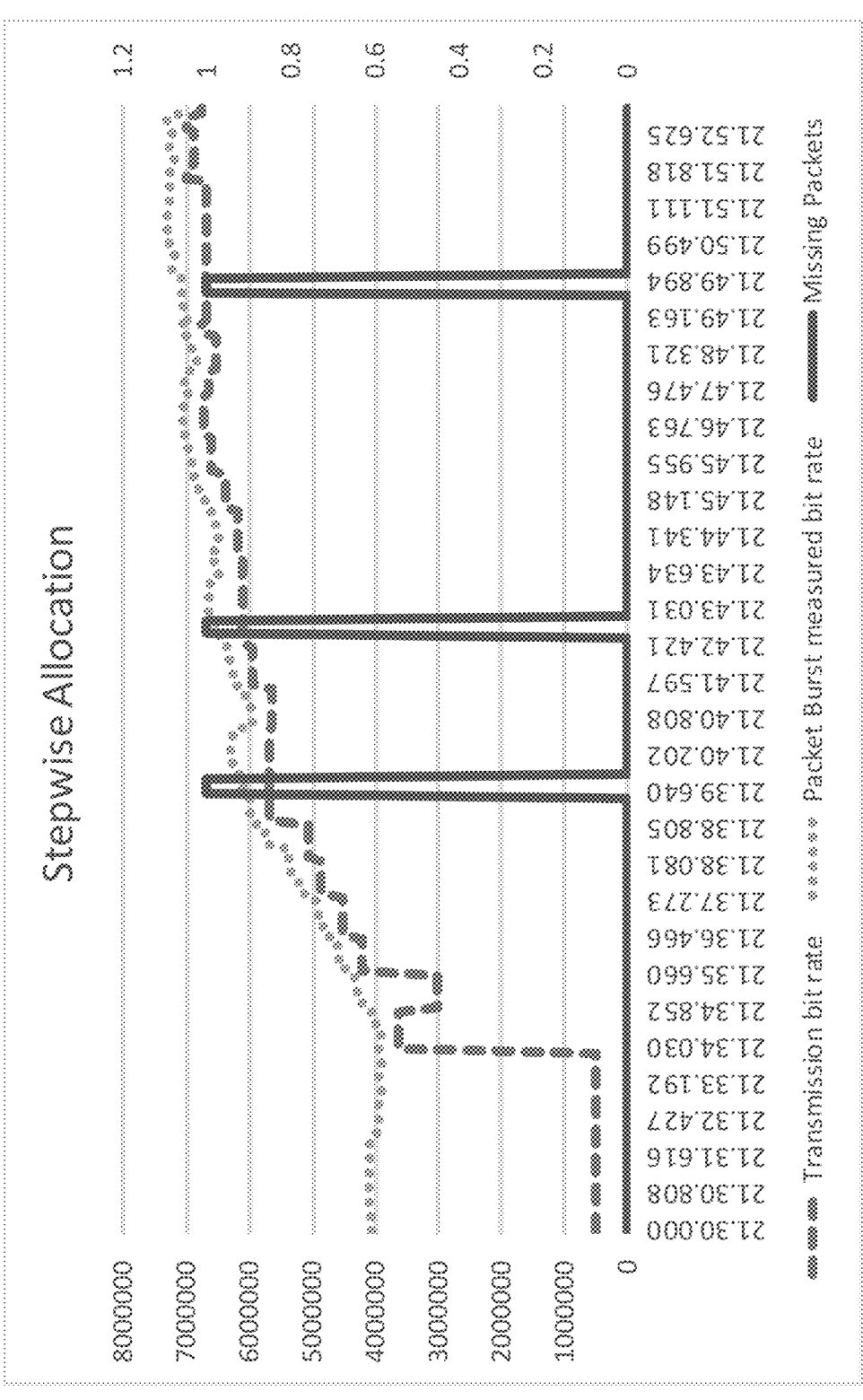
FIG. 4 is a graph illustrating an example response to a step-wise allocation approach, according to some embodiments.

FIGS. 3 and 4 are illustrative example graphs of network responses to network probes where different bandwidth request steps and/or bursts are utilized to probe network responses to identify increases in latency (spike) or packet loss. Understanding the network responses may aid in assessing whether there is opportunity for requesting additional capacity beyond the nominally provided capacity, and in some situations, network responses may be transient and adapted to opportunistically utilize the identified additional capacity.

FIG. 3 is a graph illustrating an example response to a rapid/greedy allocation approach, according to some embodiments. As illustrated in the example graph, a number of missing packets is experienced in relation to the early increased steps of the transmission bit rate and the packet burst measured bit rate, but the number of missing packets reverts back to a negligible level once bandwidth reallocation has occurred. Accordingly, the approach was able to identify an opportunity to increase bandwidth beyond a nominal allocation.

FIG. 4 is a graph illustrating an example response to a step-wise allocation approach, according to some embodiments. As indicated in FIG. 4, a targeted increase in bandwidth over time via a sequence of steps that are known to not induce packet loss or a latency spike is illustrated. A series of missing packets are detected as the steps increase beyond a particular level, but in the example shown, the packet loss is transient and the bandwidth usable. This approach can be made to be adaptive to trade-off the time required to realize the required to get increased bandwidth allocation versus the packet loss and latency spikes experienced.

As shown in FIGS. 3 and 4, at one end, a greedy approach is possible, and at the other end, a gradual ramp over time to get increased bandwidth allocated from the shared network bandwidth is possible. However, combined approaches may be utilized, and other probing approaches are possible.

Figure 5:
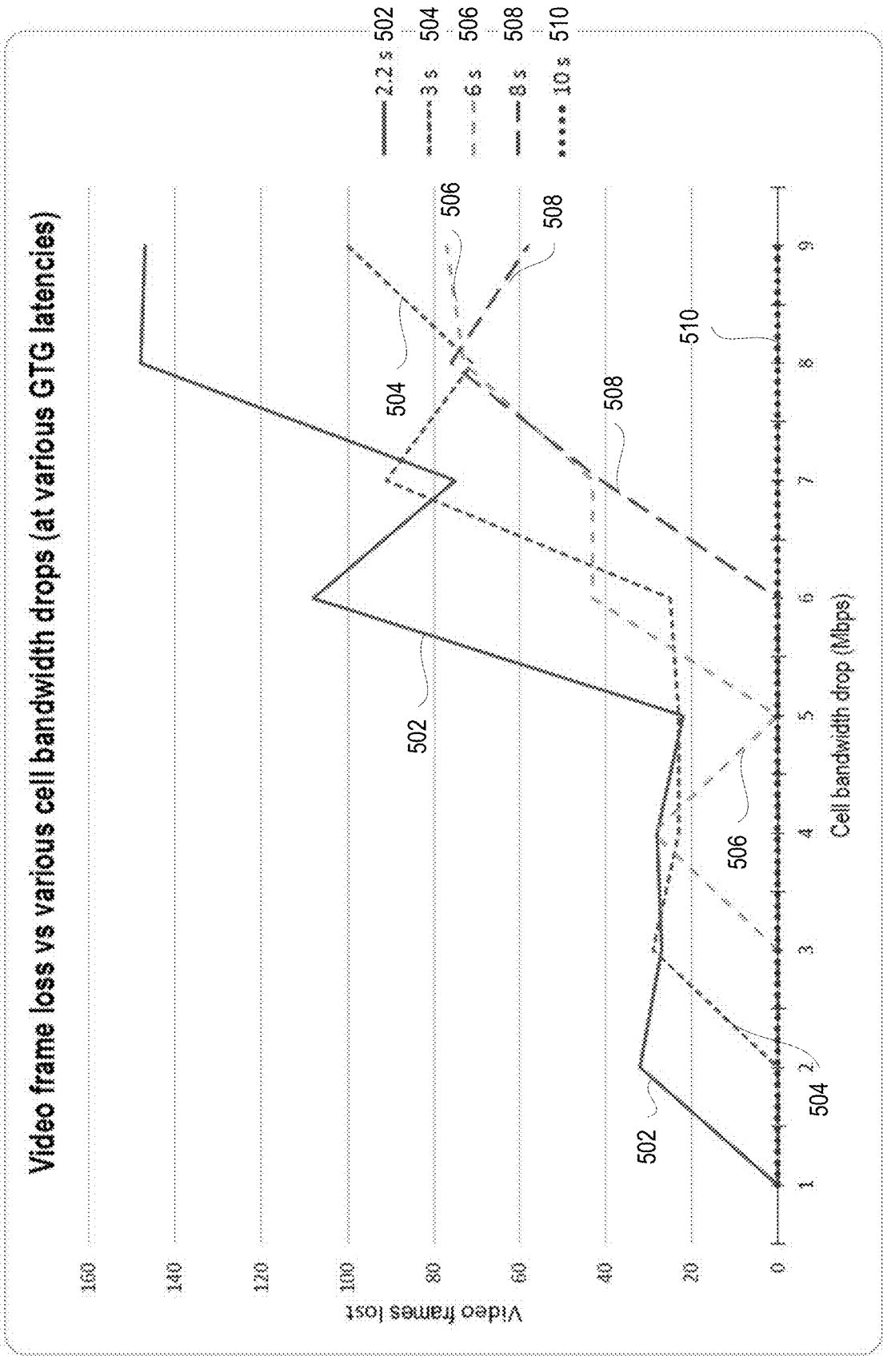
FIG. 5 is a graph illustrating video frame loss as compared to various cell bandwidth drops, at various glass to glass latencies, according to some embodiments.

FIG. 5 is a graph illustrating video frame loss as compared to various cell bandwidth drops, at various glass to glass latencies 502, 504, 506, 508, 510, according to some embodiments. FIG. 5 is illustrative of experimental data obtained, wherein video frame loss versus cell bandwidth loss is shown for different glass to glass latencies, and the results show that as expected, the system can realize low frame loss for 2.2 s glass-to-glass latency for rapid and extreme reductions in cell bandwidth up to approximately 5 Mbps. For cell bandwidth drops above 5 Mbps more frame loss occurs, and increasing latencies generally results in reduced frame loss for a fixed glass-to-glass latency.

FIGS. 6-11 illustrate a sample step-wise bandwidth probing approach, whereby a networking routing device adjusts capacity in an effort to measure potential available bandwidth and the network reacts to the devices that are using the step-wise method for obtaining more bandwidth.

Potential drawbacks of the step-wise bandwidth probing approach may include that multiple steps are required to achieve final requested bit rate, and a long time may be required to achieve same bit rate to (possibly) recover lost data of other connections and send new data. However, the approach has potential benefits wherein requesting extra capacity may not incur as much packet loss or increased latency on recovery data and new data, and in relation to other devices using the network connection, they may experience a gradual capacity decrease (as opposed to a sudden capacity decrease).

In FIGS. 6-11, sample steps are taken by a network routing device to allocate bandwidth when one of the transmitters makes a request beyond the currently allocated capacity (AC).

Figure 6:
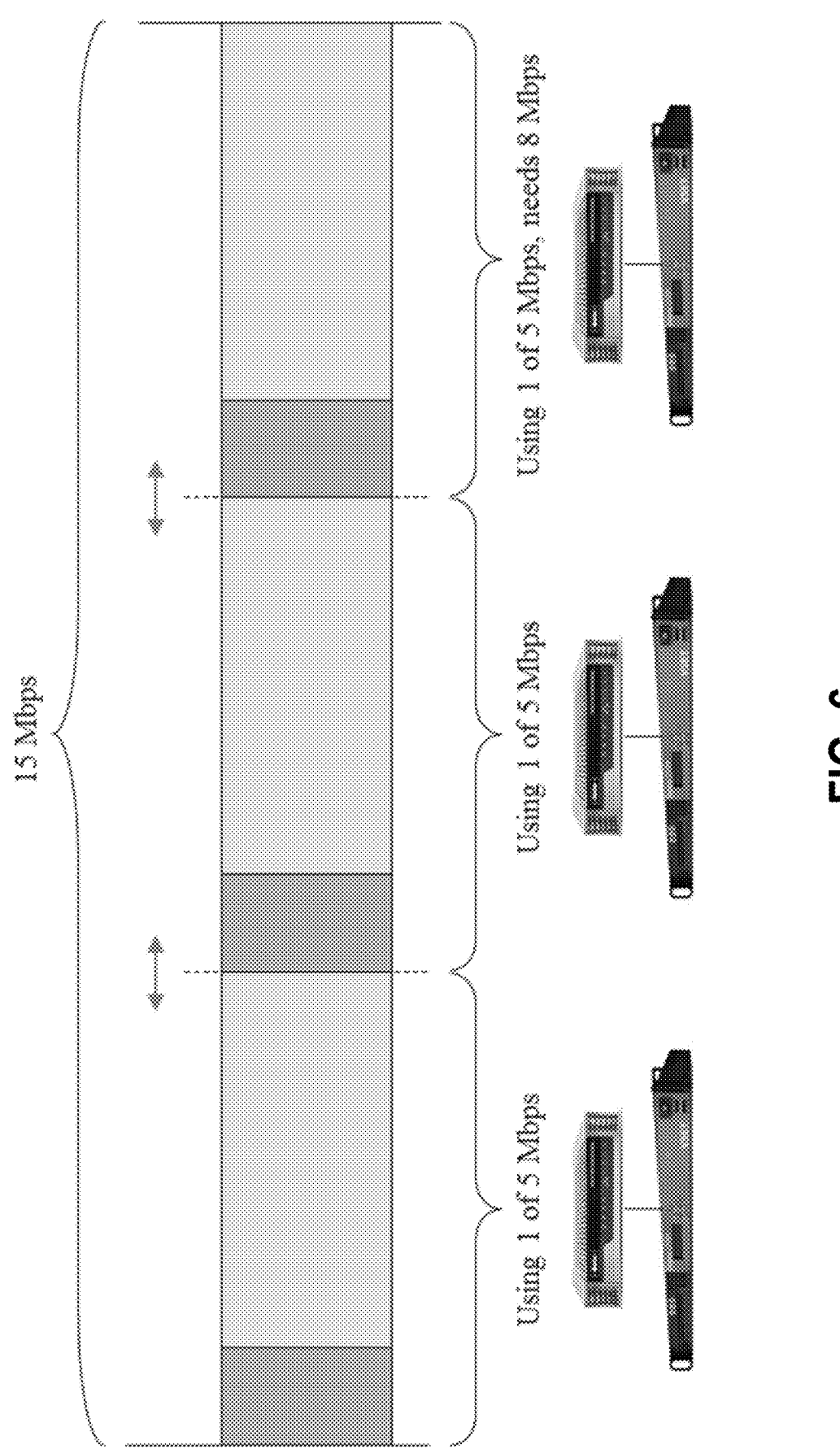
FIGS. 6-11 illustrate a sample step-wise bandwidth probing approach, whereby a networking routing device adjusts capacity in an effort to measure potential available bandwidth and the network reacts to the devices that are using the step-wise method for obtaining more bandwidth, according to some embodiments.
Figure 7:
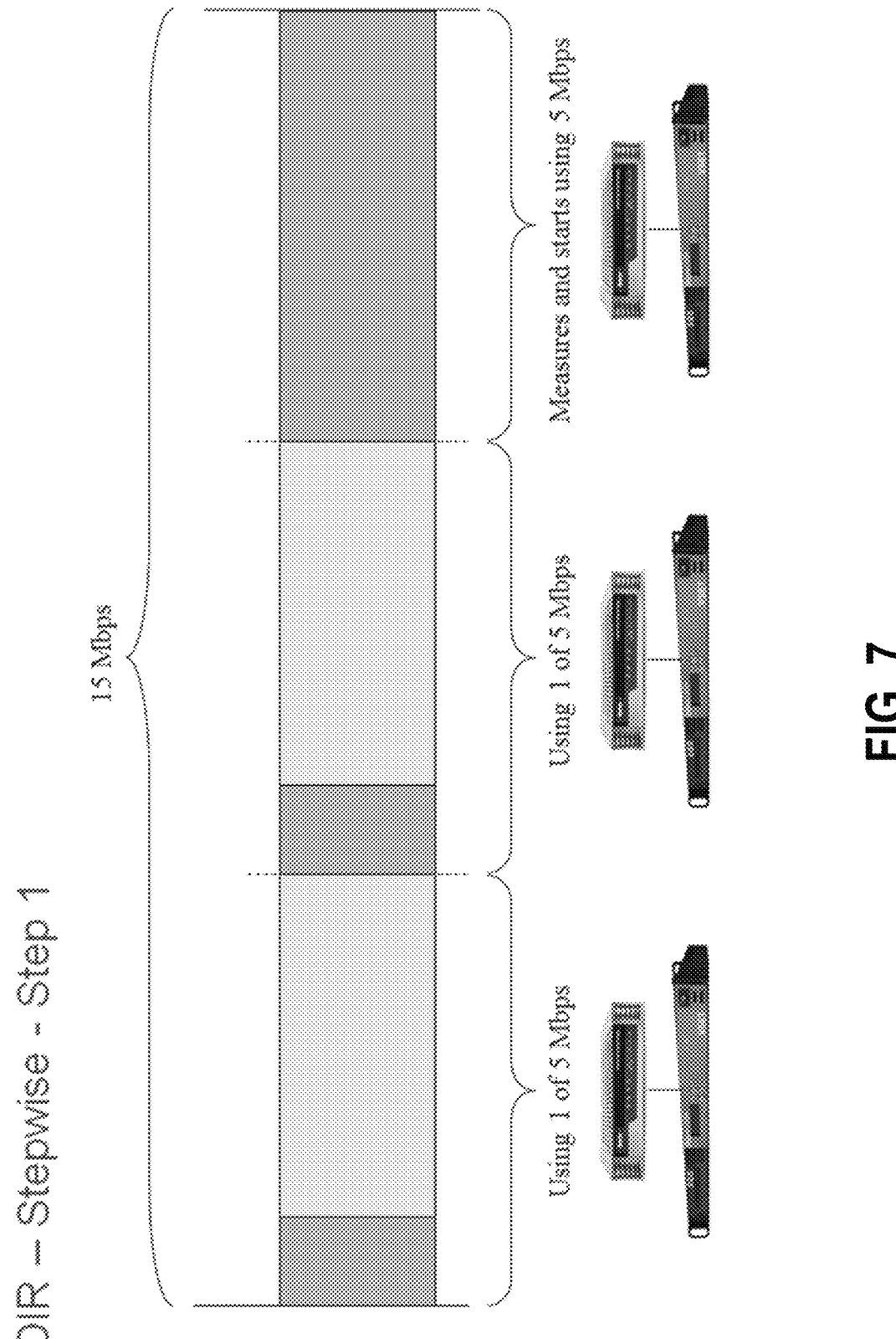
Figure 8:
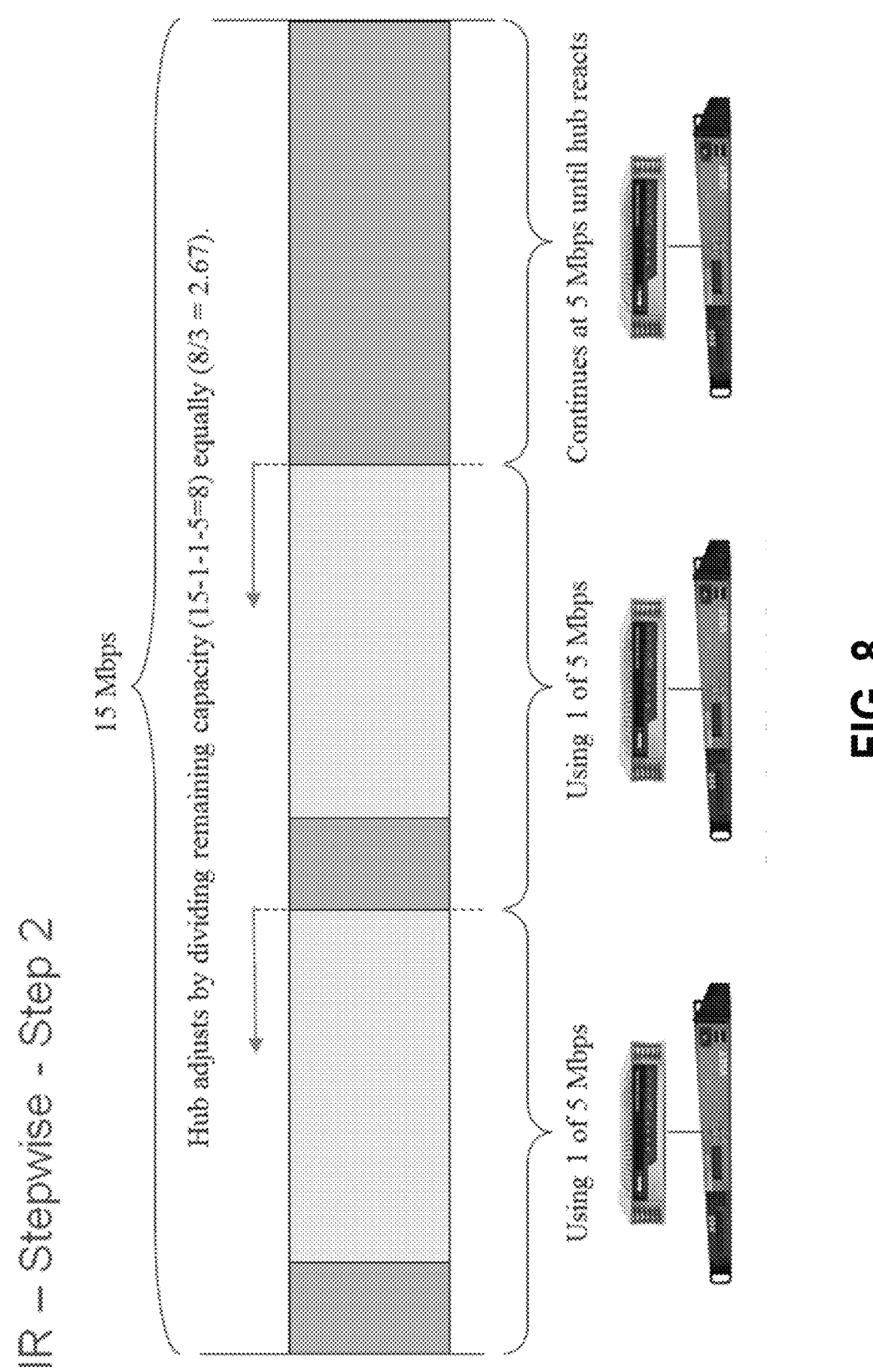
Figure 9:
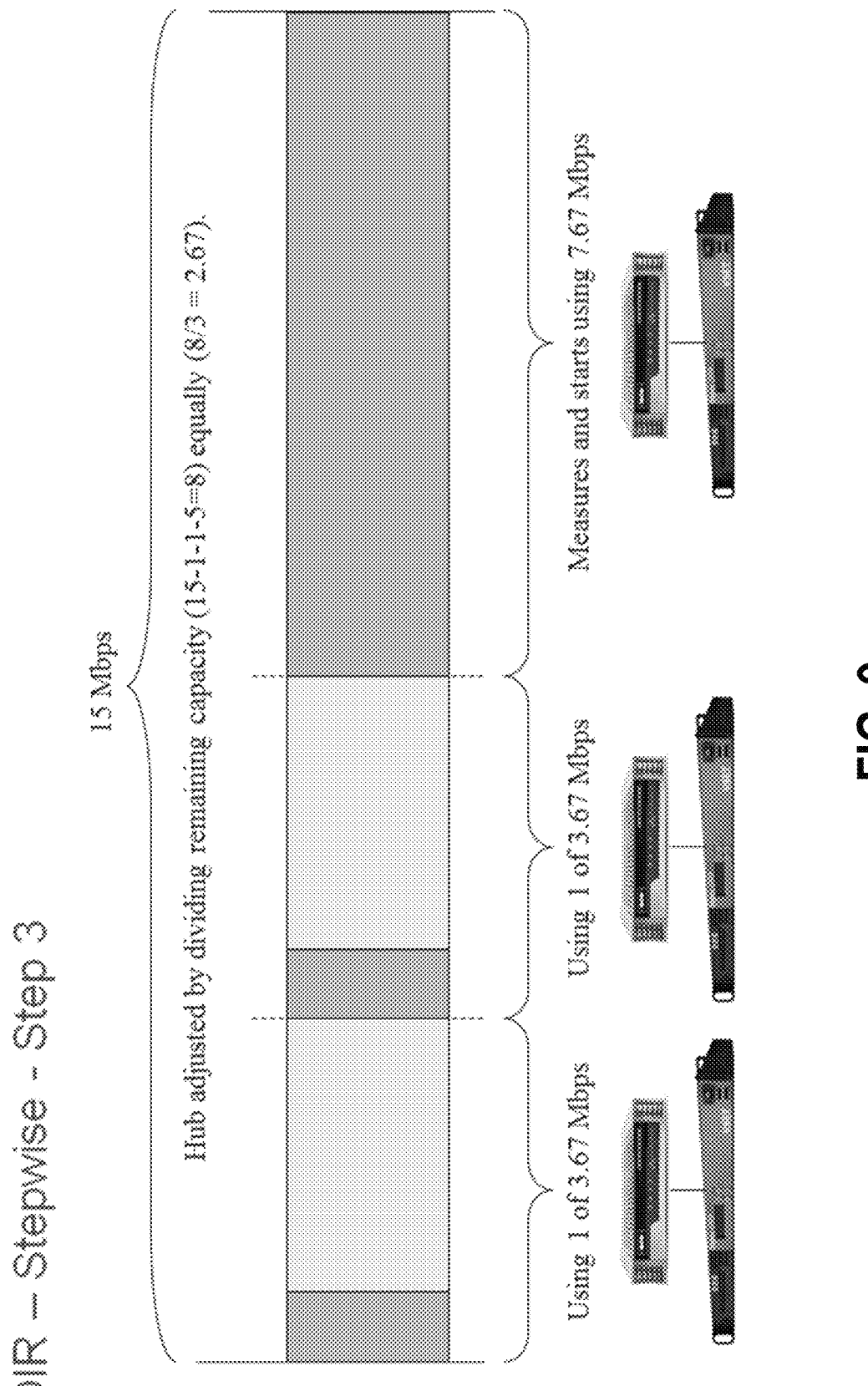
Figure 10:
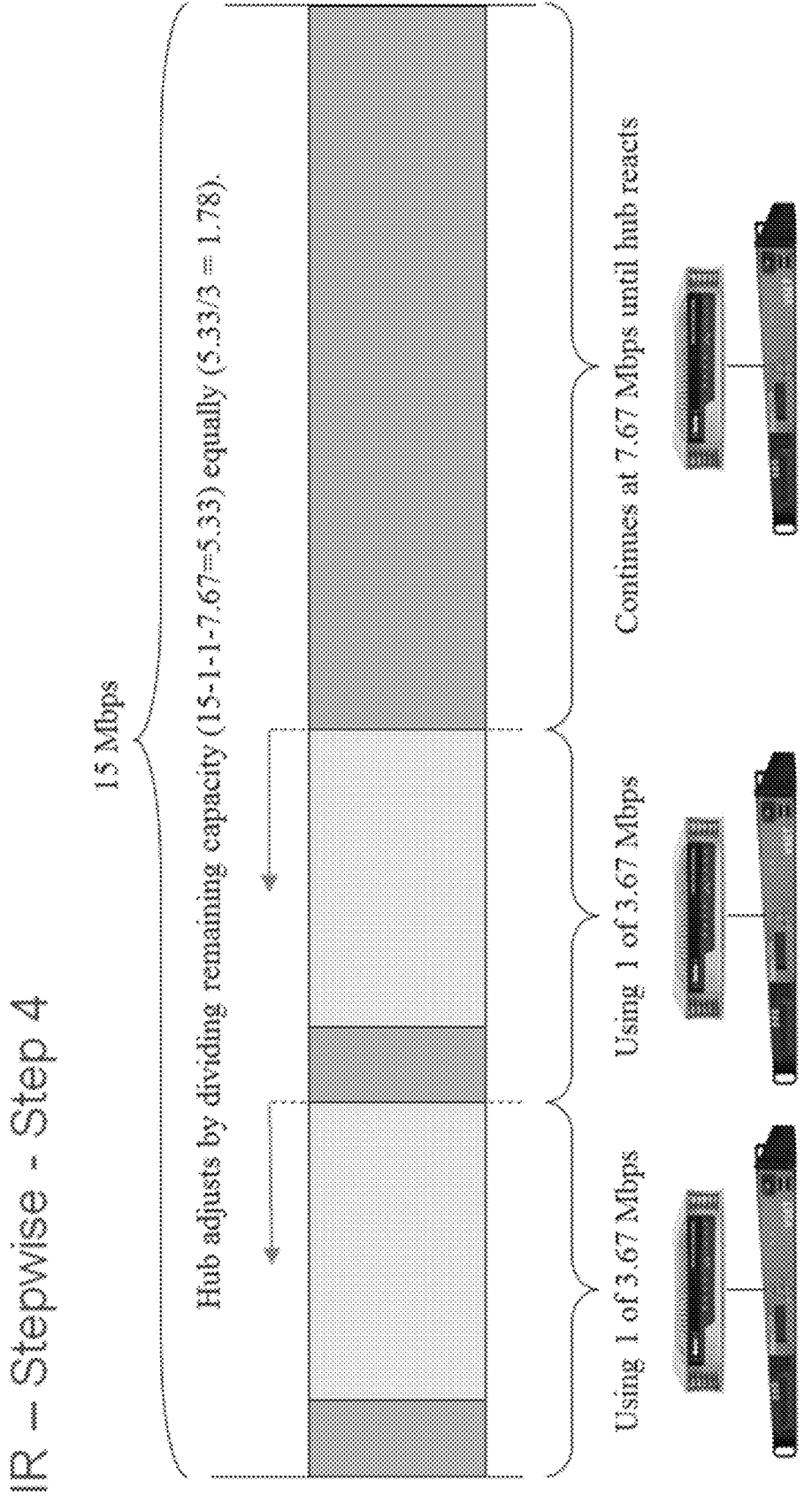
Figure 11:
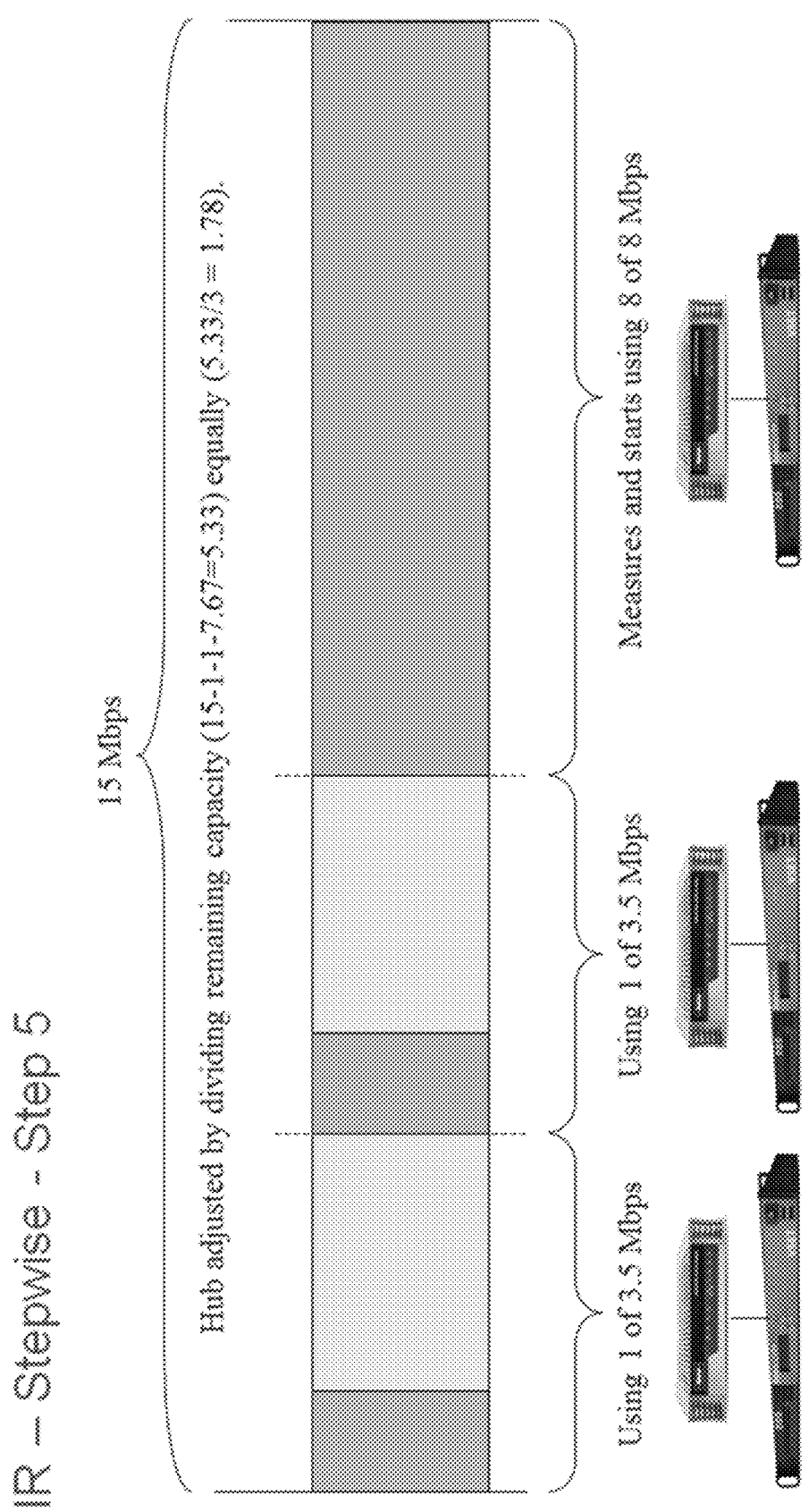

As shown in FIG. 6, the networking routing device is configured for Dynamic-Ingress-Rate (DIR), the number of active terminals are three, the total bandwidth is 15 Mbps, the current AC to each terminal is 5 Mbps and the initial state of the system is that all terminal are using only 1 Mbps.

As shown in Step 1 (FIG. 7), the transmitter needs to increase the bit-rate from 1 Mbps to 8 Mbps.

The transmitter starts transmitting at 5 Mbps with no problems.

As shown on Step 2 (FIG. 8), the networking routing device starts adjusting the remaining capacity. The networking routing device starts the process to allocate the extra 3 Mbps needed by checking the remaining free capacity and dividing it by the number of terminals [15−1−1−5=8 Mbps; 8/3=2.67 Mbps] to calculate how much bandwidth it will set the new AC of the active terminals and increase the AC of the terminal requesting more bandwidth.

At Step 3 (FIG. 9), the AC of the two active terminals is now 3.67 Mbps (1 Mbps+2.67 Mbps).

At Step 4 (FIG. 10), the terminal requesting more bandwidth will get increased to 7.67 Mbps (5 Mbps+2.67 Mbps). The terminal "sees" the 7.76 Mbps AC and begins transmitting at this rate.

At Step 5 (FIG. 11), the networking routing device performs another round of calculations to determine the next increase of AC by following the same or similar process, in this case the numbers have changed [15-1-1-7.67=5.33 Mbps; 5.33/3=1.78 Mbps]. At this point the transmitter observes the response and starts transmitting at 8 Mbps.

An example calculation of potential best case time is provided wherein:

Let C be the full hub capacity

Let K be the total number of online terminals.

Let R be the minimum bit rate at each terminal.

Let T be the target bit rate requested by on terminal.

Let n be the number of iterations (steps)

$$T = \left(C/K + (K-1)R - C\right)\left(1 - 1/K\right)^n + (C - (K-1)R)$$

$$n =$$

-continued $$\left[\log(C - T - (K-1)R) - \log(C - C/K - (K-1)R)\right]/\left[\log(K-1) - \log(K)\right]$$

CIR (Committed information rate—the guaranteed rate that will be allocated to the terminal)=10 Mbps, C=15 Mbps, K=3

$$T = 10 \text{ Mbps}, R_1 = 1 \text{ Mbps}, R_{2,3} = 2 \text{ Mbps}$$

Figure 12:
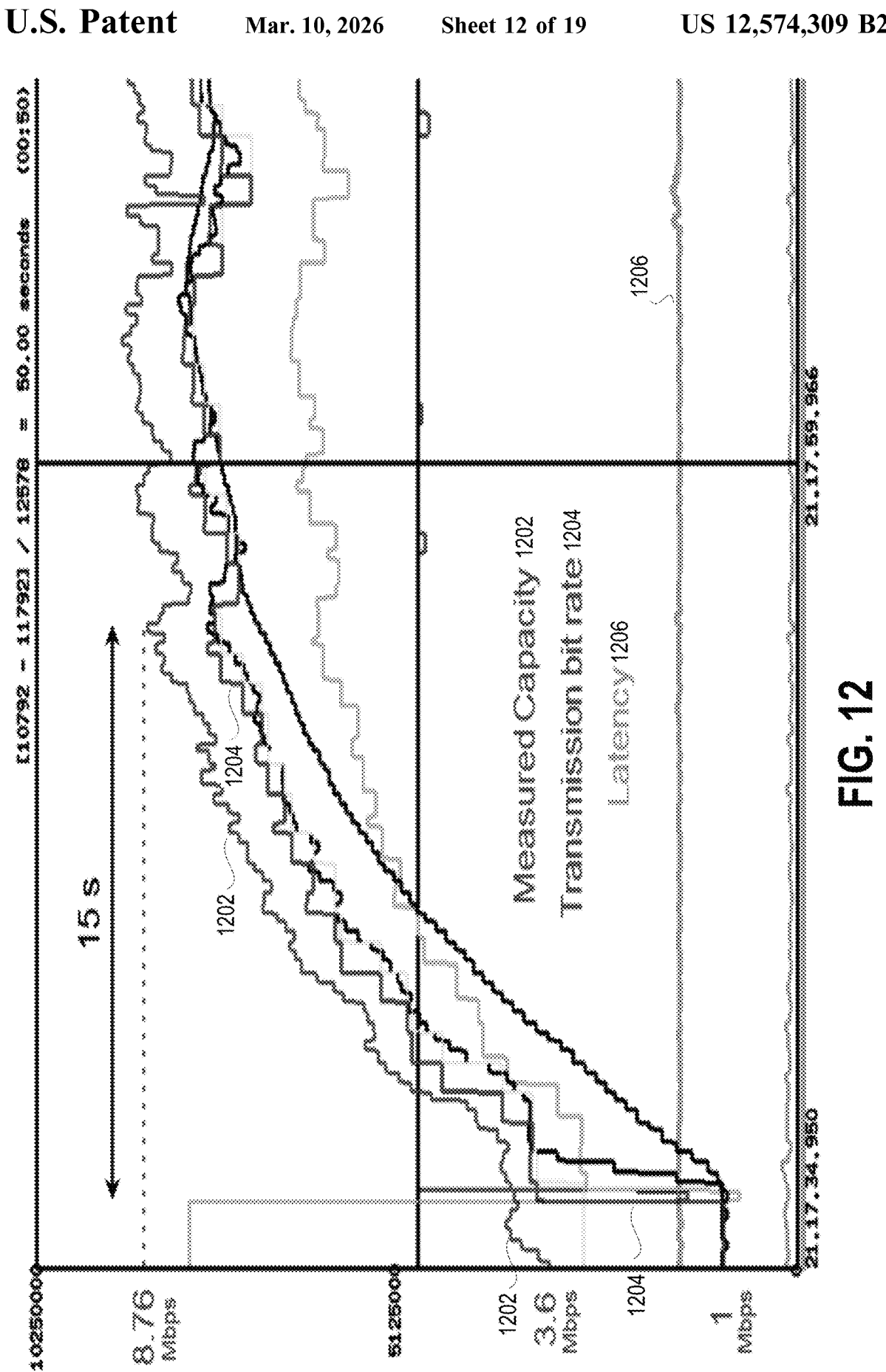
FIG. 12 is a graph illustrating measured capacity as compared to transmission bitrate and latency, according to some embodiments.

FIG. 12 is a graph illustrating measured capacity as compared to transmission bitrate and latency, according to some embodiments. In FIG. 12, the measured capacity 1202 is shown, along with the transmission bitrate 1204, and the measured latency 1206. In this example, the measured latency 1206 has not increased despite the increase in transmission bit rate 1204.

Figure 13:
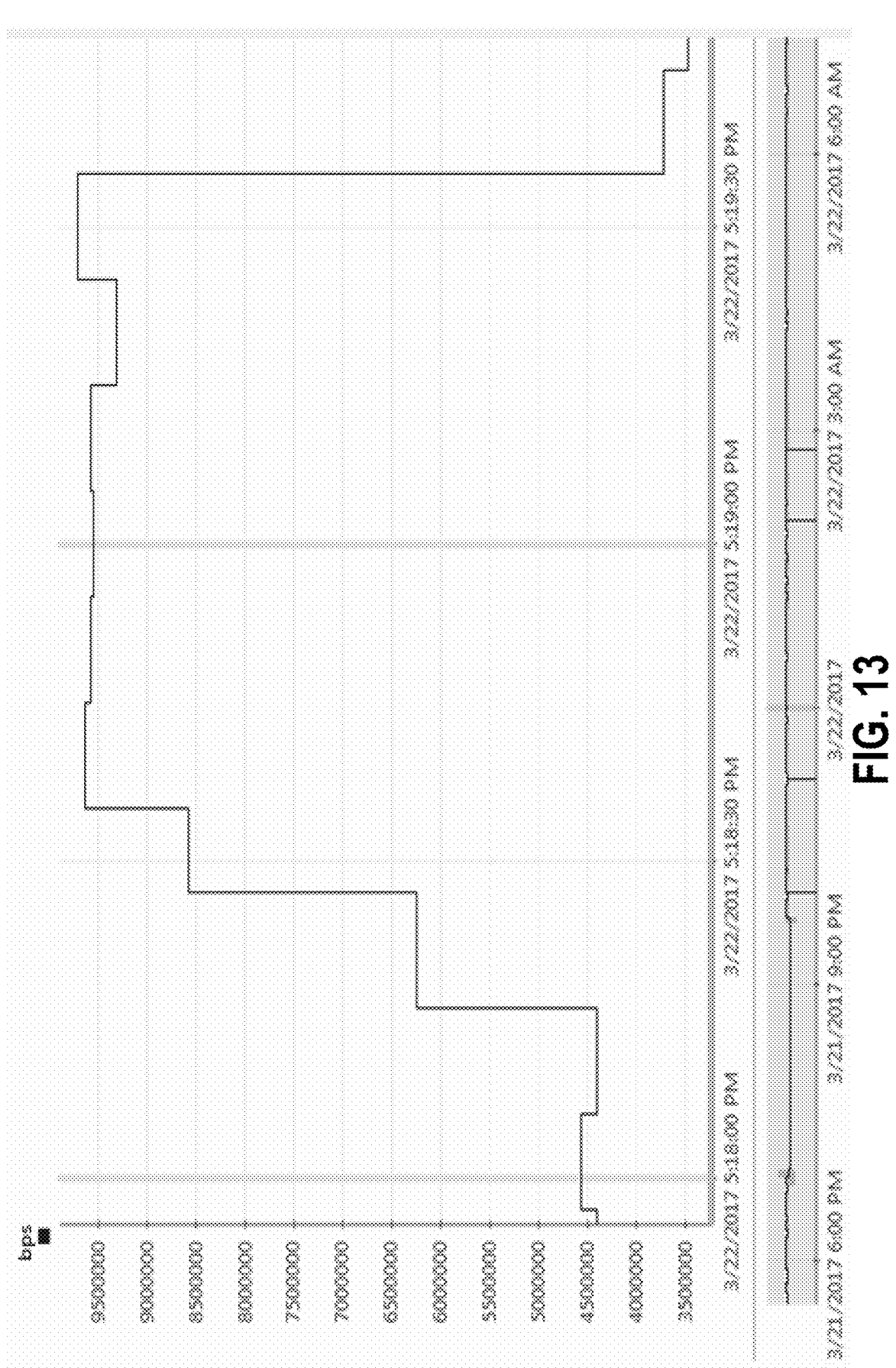
FIG. 13 is a graph illustrating trending bitrates, according to some embodiments.
Figure 14:
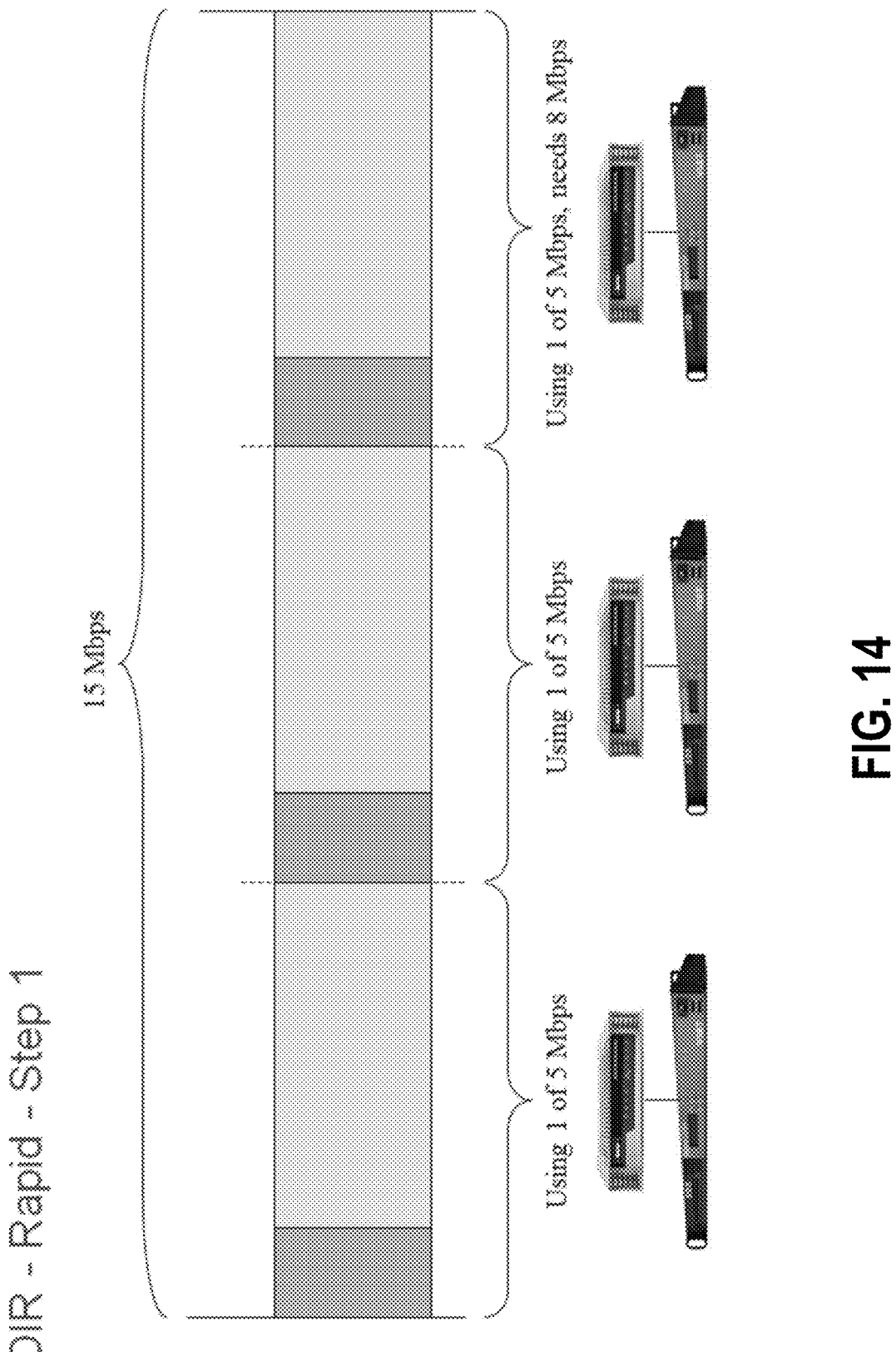
FIGS. 14-17 illustrate a sample rapid/greedy bandwidth probing approach, whereby a networking routing device adjusts capacity in an effort to measure potential available bandwidth and the network reacts to the devices that are using the rapid/greedy method for obtaining more bandwidth.
Figure 15:
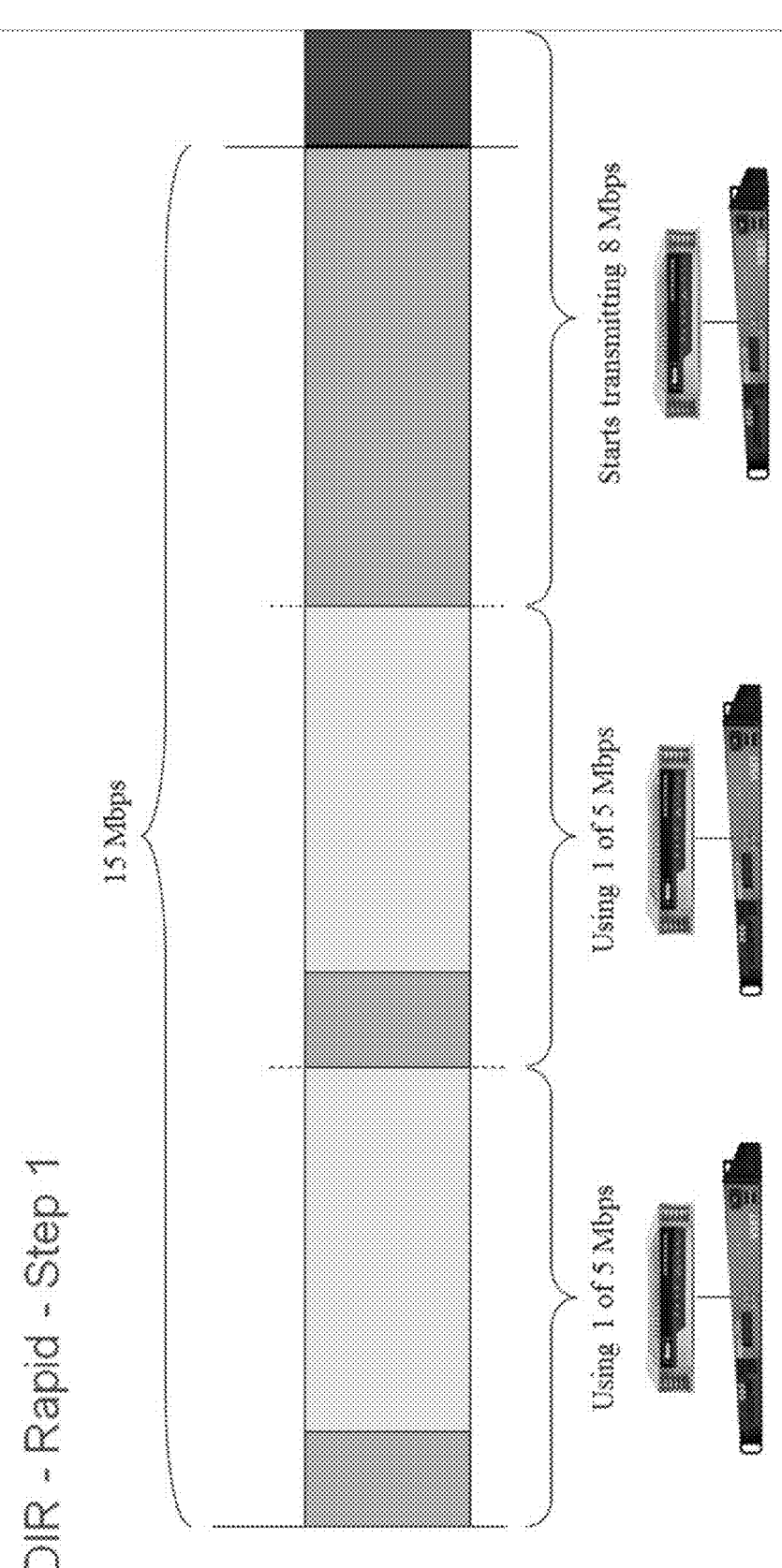
Figure 16:
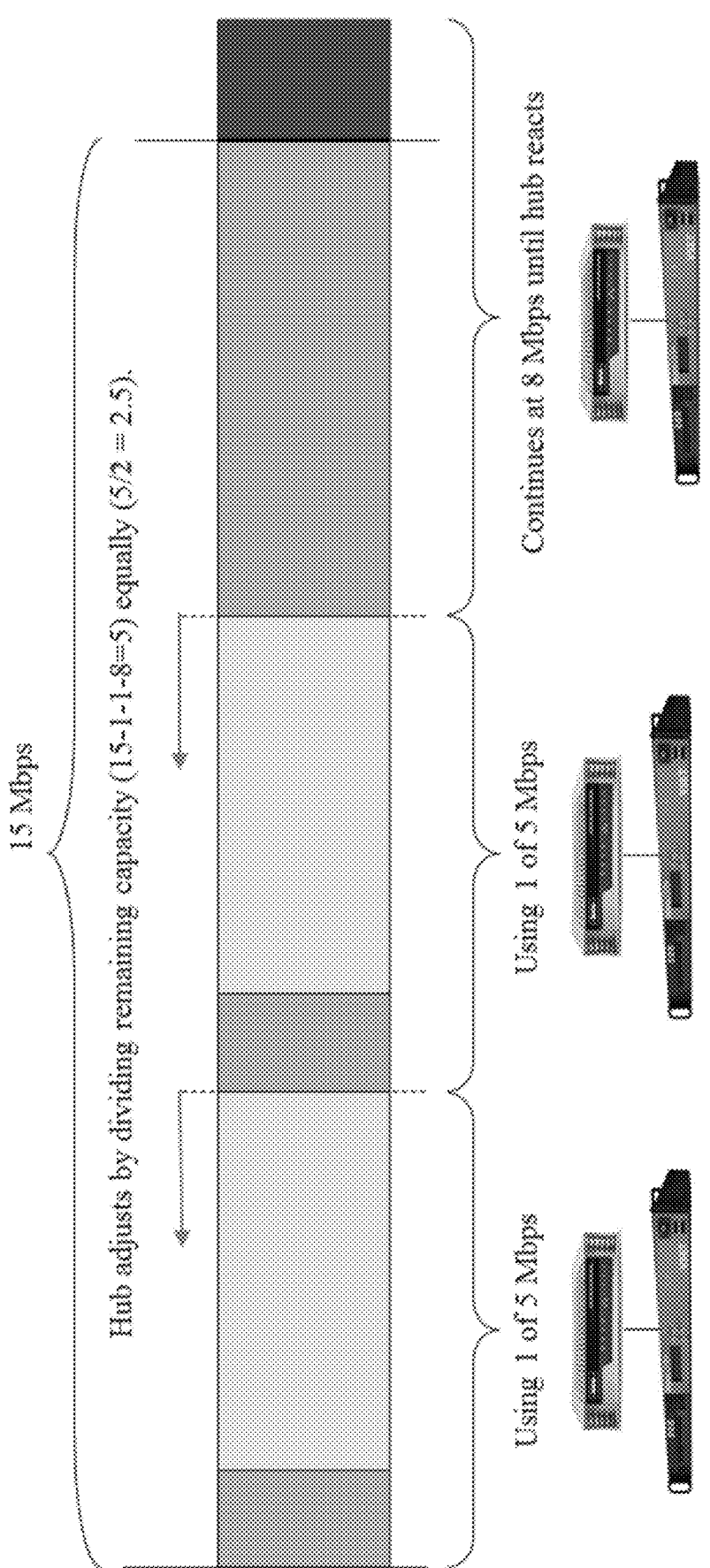
Figure 17:
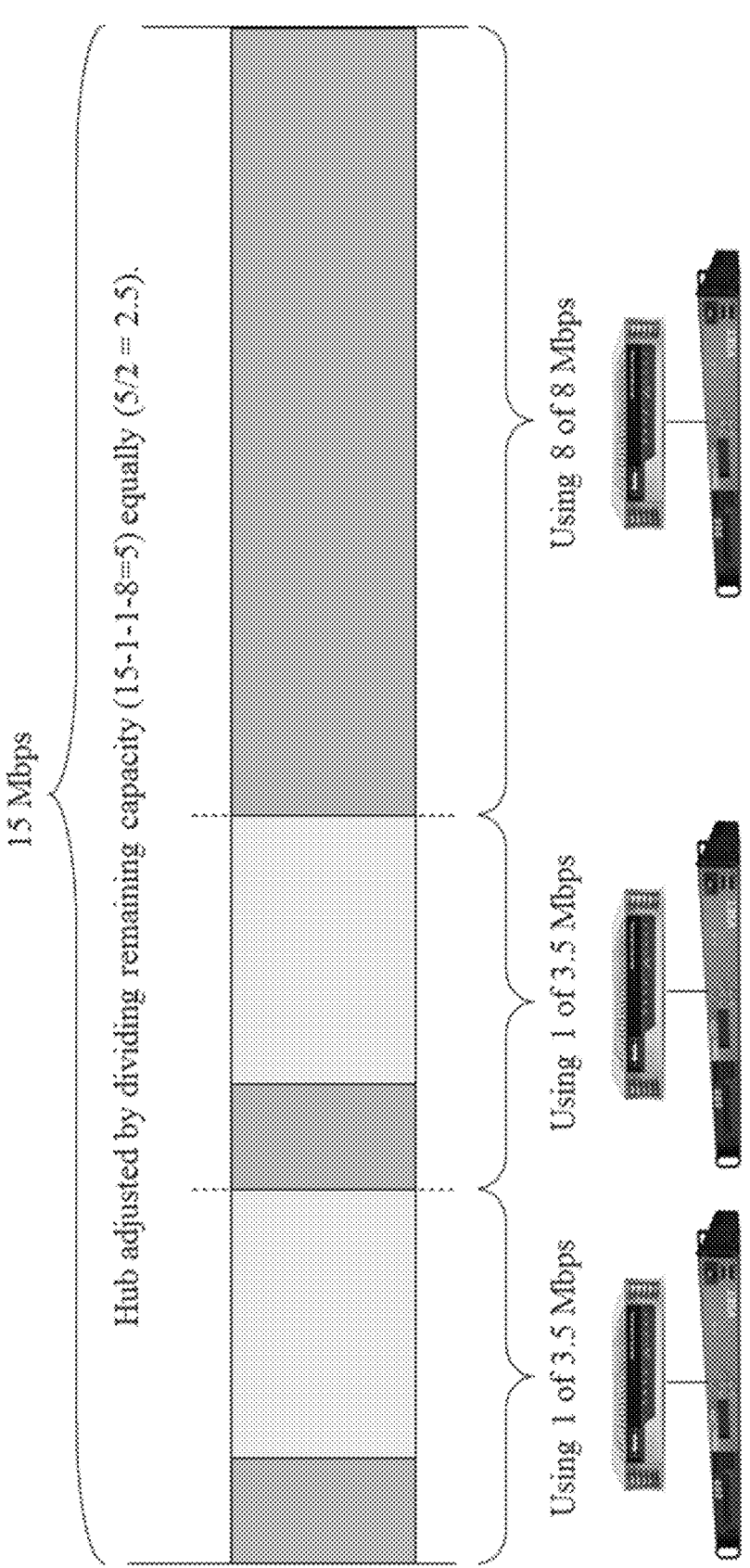

FIG. 13 is a graph illustrating trending bitrates, according to some embodiments, in relation to step-wise latency and bitrate performance.

FIGS. 14-17 illustrate a sample rapid/greedy bandwidth probing approach, whereby a networking routing device adjusts capacity in an effort to measure potential available bandwidth and the network reacts to the devices that are using the step-wise method for obtaining more bandwidth.

The paragraphs describe example steps taken by the networking routing device to allocate bandwidth when one of the transmitters makes a request beyond the currently assigned capacity (AC).

At Step 1, (FIG. 14), the networking routing device is configured for Dynamic-Ingress-Rate (DIR), the number of active terminals are three, the total bandwidth is 15 Mbps, the AC for each terminal is 5 Mbps and the initial state of the system is that all terminals are using only 1 Mbps.

The transmitter needs to increase the bit-rate from 1 Mbps to 8 Mbps

At Step 2, (FIG. 15), The transmitter starts transmitting at 8 Mbps, the HUB only accepts 5 Mbps so the remaining packets are lost At Step 3, (FIG. 16), The networking routing device starts decreasing the AC of the active terminals to accommodate the sudden increased bit-rate of the other terminal by applying the bandwidth allocation process as follows: [15-1-1−8=5 Mbps; 5/2=2.5 Mbps]

At Step 4, (FIG. 17), The networking routing device is adapted to reconfigure the AC of the two active terminals to be [1+2.5=3.5 Mbps] 3.5 Mbps allowing the requested increase in bandwidth of the other terminal at 8 Mbps.

Figure 18:
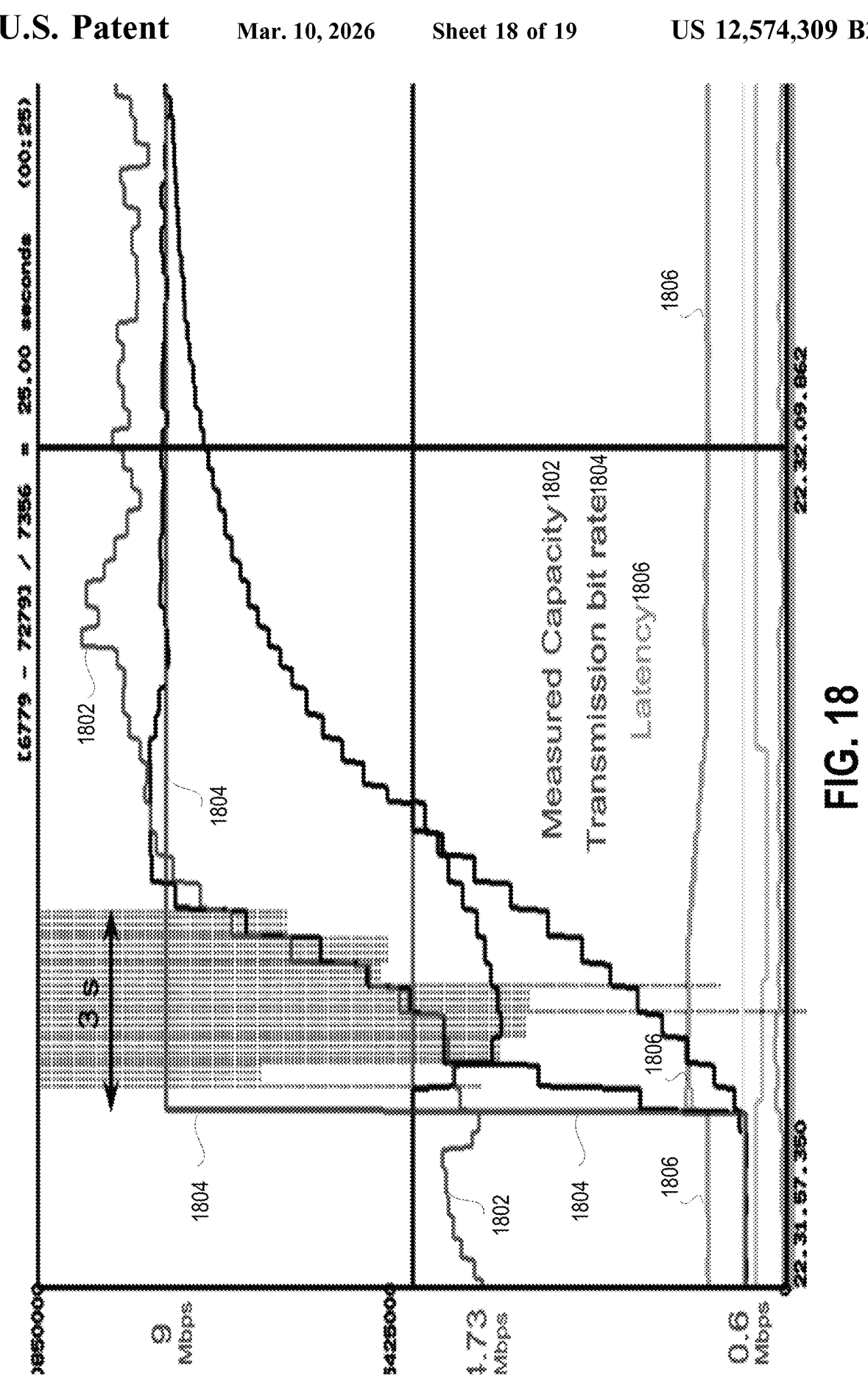
FIG. 18 is a graph illustrating measured capacity as compared to transmission bitrate and latency, according to some embodiments.

FIG. 18 is a graph illustrating measured capacity as compared to transmission bitrate and latency, according to some embodiments. Rapid latency and bitrate performance is shown, where CIR=10 Mbps, C=15 Mbps, K=3, T=9 Mbps, R1=0.6 Mbps, and $R_{2,3}$=1 Mbps.

CIR is the max bitrate for a single terminal, let C be the full hub capacity, K is the total number of online terminals, R is the minimum bit rate at each terminal, T is the target bit rate requested by a device, and n is the number of iterations (steps).

In FIG. 18, the measured capacity 1802 is shown, along with the transmission bitrate 1804, and the measured latency 1806. In this example, the measured latency 1806 has not increased despite the increase in transmission bit rate 1804.

Figure 19:
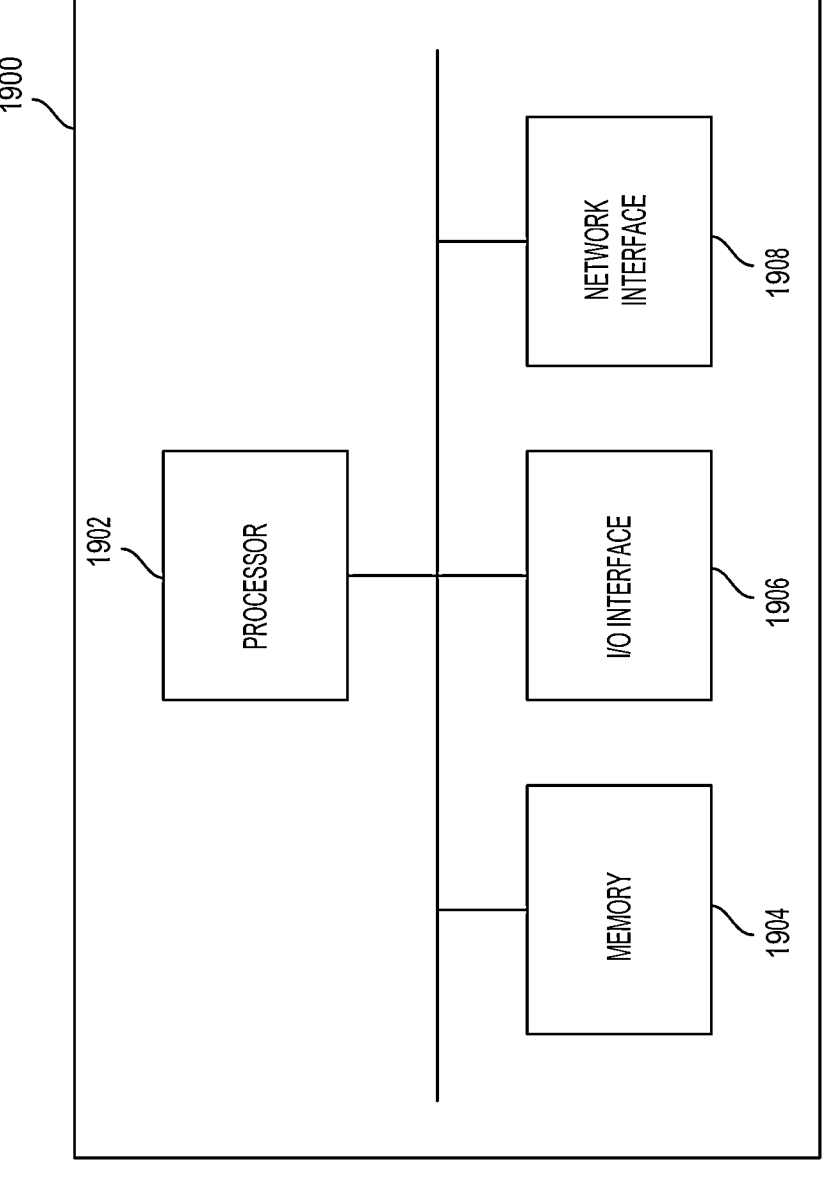
FIG. 19 is a diagram of a sample computing device, according to some embodiments.

FIG. 19 is a diagram of a sample computing device, according to some embodiments.

FIG. 19 is a schematic diagram of computing device 1900. As depicted, computing device includes at least one processor 1902, memory 1904, at least one I/O interface 1906, and at least one network interface 1908.

Processor 1902 may be an Intel or AMD x86 or x64, PowerPC, ARM processor, among others. Memory 1904 may include a combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1906 enables computing device 1900 to interconnect with one or more input devices, such as a keyboard, mouse, camera, touch screen and a microphone, or with one or more output devices such as a display screen and a speaker.

Each network interface 1908 enables computing device 1900 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 1900 can be operable to register and authenticate users (using a login, unique identifier, and password for example) prior to providing access to applications, a local network, network resources, other networks and network security devices. Computing devices 1900 may serve one user or multiple users, or multiple devices. Computing device 1900, in some embodiments, is a networking router device 100 that is configured to measuring potential overcapacity opportunities by controlling probing activities by a network interface 106, tracking network 250 responses at network monitoring unit 108 and maintaining an overcapacity opportunity data structure at data storage 130, which for example, is a matrix of network connections, contextual information in relation to a measurement (e.g., timestamp, location of router), and maximum potential overcapacity before latency/adverse network effects are detected. When an overcapacity request (e.g., emergency request) is made to networking router device 100, the networking router device 100 is configured to mediate traffic to the networks 150 and to make corresponding overcapacity requests based on the information stored in the data structure on data storage 130. In other embodiments, the networking router device 100 tracks a measured reliability against a targeted reliability and can generate alerts and notifications if the targeted reliability is not met, and/or control the requesting of additional resources to ensure that the targeted reliability is met.

The embodiments of the devices, systems and methods described herein may be implemented in a combination of both hardware and software.

These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer implemented method for assessing network bandwidth availability in any one network connection of a plurality of network connections each having a corresponding allocated capacity which in total is a full hub capacity, the network connection having unknown excess capacity beyond a first network capacity, the method comprising:

maintaining a data structure storing an estimated maximum network capacity value for a selected network connection of the plurality of network connections;

generating a probe data payload paired with one or more non-probe data payloads, the probe data payload including additional data based on the one or more non-probe data payloads;

transmitting the probe data payload and the one or more non-probe data payloads through the selected network connection, the probe data payload and the one or more non-probe data payloads exceeding the estimated maximum network capacity value for the selected network connection by an amount;

monitoring one or more network response characteristics of the elected network connection to determine whether at least one of increased latency or increased packet loss occurs responsive to the transmission during a corresponding time of day or at a corresponding location of a device transmitting the probe data payload and the one or more non-probe data payloads;

responsive to the one or more network response characteristics indicating that neither increased latency or increased packet loss occurs, updating the data structure to increase the estimated maximum network capacity value for the selected network connection, the estimated maximum network capacity value representative of the assessed network bandwidth availability for a duration corresponding to the corresponding time of day or for an area corresponding to the corresponding location; and responsive to an overcapacity data request for additional availability for usage of existing network connections beyond nominally allocated capacities during the duration corresponding to the corresponding time of day or from a device located within the area, communicating the overcapacity data request at least partially on the selected network connection by reconfiguring the corresponding allocated capacity of the plurality of network connections to allow for the overcapacity data request during a period of the overcapacity data request based at least on a corresponding estimated maximum network capacity value.

2. The method of claim 1, wherein the probe data payload is sized such that the latency responsive to the addition of the probe data payload to the transmission is less than or equal to a glass-to-glass latency between a transmitter and an endpoint.

3. The method of claim 1, wherein the probe data payload is sized such that the latency responsive to the addition of the probe data payload to the transmission is less than or equal to a glass-to-glass latency between a transmitter and an endpoint reduced by a safety factor margin.

4. The method of claim 1, wherein the probe data payload is sized to cause a burst in bandwidth required for the transmission of the probe data payload and the one or more non-probe data payloads.

5. The method of claim 4, wherein at least one of the increased latency and the increased packet loss is averaged across a pre-defined duration of time.

6. The method of claim 1, comprising:

iteratively probing the selected network connection by generating one or more additional probe data payloads, each sequential additional probe data payload of the one or more additional probe data payloads being sized to require differing amounts of data than a previous probe data payload, the one or more additional probe data payloads used to iteratively update the estimated maximum network capacity value for the network connection over a period of time; and wherein the size of each sequential additional probe data payload is increased responsive to the one or more network response characteristics when the one or more network response characteristics indicate that neither increased latency or increased packet loss occurs; or wherein the size of each sequential additional probe data payload is decreased responsive to the one or more network response characteristics when the one or more network response characteristics indicate that at least one of increased latency and increased packet loss occurs.

7. The method of claim 6, wherein the size of the increase or the decrease of size of each sequential additional probe data payload is a constant value.

8. The method of claim 6, wherein the iterative probing occurs until a steady state estimated maximum network capacity value is observed for a period of time, and comprising: updating the data structure to store the steady-state estimated maximum network capacity value.

9. The method of claim 1, wherein the estimated maximum network capacity value is reserved for usage during at least one of emergency or priority communications.

10. The method of claim 1, wherein the data structure is populated with an initial estimated maximum network capacity value set at an initial network capacity value.

11. A computer implemented system for assessing network bandwidth availability in any one network connection having unknown excess capacity beyond a first network capacity, the system comprising:

a data storage configured to maintain a data structure storing an estimated maximum network capacity value for a selected network connection of the plurality of network connections;

a processor configured to generate a probe data payload paired with one or more non-probe data payloads, the probe data payload including additional data based on the one or more non-probe data payloads;

a network interface configured to transmit the probe data payload and the one or more non-probe data payloads through the selected network connection, the probe data payload and the one or more non-probe data payloads exceeding the estimated maximum network capacity value for the selected network connection by a controlled amount;

the processor further configured to:

monitor one or more network response characteristics of the selected network connection to determine whether at least one of increased latency or increased packet loss occurs responsive to the transmission during a corresponding time of day or at a corresponding location of a device transmitting the probe data payload and the one or more non-probe data payloads;

responsive to the one or more network response characteristics indicating that neither increased latency or increased packet loss occurs, update the data structure to increase the estimated maximum network capacity value for the selected network connection, the estimated maximum network capacity value representative of the assessed network bandwidth availability for a duration corresponding to the corresponding time of day or for an area corresponding to the corresponding location; and responsive to an overcapacity data request for additional availability for usage of existing network connections beyond nominally allocated capacities during the duration corresponding to the corresponding time of day or from a device located within the area, communicate the overcapacity data request at least partially on the selected network connection by reconfiguring the corresponding allocated capacity of the plurality of network connections to allow for the overcapacity data request during a period of the overcapacity data request based at least on a corresponding estimated maximum network capacity value.

12. The system of claim 11, wherein the probe data payload is sized such that the latency responsive to the addition of the probe data payload to the transmission is less than or equal to a glass-to-glass latency between a transmitter and an endpoint.

13. The system of claim 11, wherein the probe data payload is sized such that the latency responsive to the addition of the probe data payload to the transmission is less than or equal to a glass-to-glass latency between a transmitter and an endpoint reduced by a safety factor margin.

14. The system of claim 11, wherein the probe data payload is sized to cause a burst in bandwidth required for the transmission of the probe data payload and the one or more non-probe data payloads.

15. The system of claim 14, wherein at least one of the increased latency and the increased packet loss is averaged across a pre-defined duration of time.

16. The system of claim 11, the processor further configured to iteratively probe the selected network connection by generating one or more additional probe data payloads, each sequential additional probe data payload of the one or more additional probe data payloads being sized to require differing amounts of data than a previous probe data payload, the one or more additional probe data payloads used to iteratively update the estimated maximum network capacity value for the network connection over a period of time; and wherein the size of each sequential additional probe data payload is increased responsive to the one or more network response characteristics when the one or more network response characteristics indicate that neither increased latency or increased packet loss occurs; or wherein the size of each sequential additional probe data payload is decreased responsive to the one or more network response characteristics when the one or more network response characteristics indicate that at least one of increased latency and increased packet loss occurs.

17. The system of claim 16, wherein the size of the increase or the decrease of size of each sequential additional probe data payload is a constant value.

18. The system of claim 16, wherein the iterative probing occurs until a steady state estimated maximum network capacity value is observed for a period of time, and comprising: updating the data structure to store the steady-state estimated maximum network capacity value.

19. The system of claim 11, wherein the estimated maximum network capacity value is reserved for usage during at least one of emergency or priority communications.

20. A non-transitory computer readable medium, storing machine interpretable instructions, which when executed, cause a processor to perform a method for assessing network bandwidth availability in any one network connection having unknown excess capacity beyond a first network capacity, the method comprising:

maintaining a data structure storing an estimated maximum network capacity value for a selected network connection of the plurality of network connections;

generating a probe data payload paired with one or more non-probe data payloads, the probe data payload including additional data based on the one or more non-probe data payloads;

transmitting the probe data payload and the one or more non-probe data payloads through the selected network connection, the probe data payload and the one or more non-probe data payloads exceeding the estimated maximum network capacity value for the selected network connection by an amount;

monitoring one or more network response characteristics of the selected network connection to determine whether at least one of increased latency or increased packet loss occurs responsive to the transmission during a corresponding time of day or at a corresponding location of a device transmitting the probe data payload and the one or more non-probe data payloads;

responsive to the one or more network response characteristics indicating that neither increased latency or increased packet loss occurs, updating the data structure to increase the estimated maximum network capacity value for the selected network connection, the estimated maximum network capacity value representative of the assessed network bandwidth availability for a duration corresponding to the corresponding time of day or for an area corresponding to the corresponding location; and responsive to an overcapacity data request for additional availability for usage of existing network connections beyond nominally allocated capacities during the duration corresponding to the corresponding time of day or from a device located within the area, communicating the overcapacity data request at least partially on the selected network connection by reconfiguring the corresponding allocated capacity of the plurality of network connections to allow for the overcapacity data request during a period of the overcapacity data request based at least on a corresponding estimated maximum network capacity value.

* * * * *